(12) United States Patent
Fux et al.

(10) Patent No.: US 12,210,749 B2
(45) Date of Patent: Jan. 28, 2025

(54) MEMORY CONTROLLER INCLUDING A WRITE STAGING BUFFER TO MANAGE WRITE REQUESTS FOR A HIGH CAPACITY MEMORY CIRCUIT WITH LARGE NUMBER OF INDEPENDENTLY ACCESSIBLE MEMORY BANKS

(71) Applicant: SUNRISE MEMORY CORPORATION, San Jose, CA (US)

(72) Inventors: Shay Fux, Kfar Yona (IL); Sagie Goldenberg, Gaaton (IL); Amotz Yagev, Sdot Yam (IL)

(73) Assignee: SUNRISE MEMORY CORPORATION, San Jose, CA (US)

( * ) Notice: Subject to any disclaimer, the term of this patent is extended or adjusted under 35 U.S.C. 154(b) by 0 days.

(21) Appl. No.: 18/357,948

(22) Filed: Jul. 24, 2023

(65) Prior Publication Data

US 2024/0045615 A1 Feb. 8, 2024

Related U.S. Application Data

(60) Provisional application No. 63/370,359, filed on Aug. 3, 2022.

(51) Int. Cl.
*G06F 13/16* (2006.01)
*G06F 3/06* (2006.01)
(52) U.S. Cl.
CPC .......... *G06F 3/0613* (2013.01); *G06F 3/0656* (2013.01); *G06F 3/0659* (2013.01); *G06F 3/0673* (2013.01); *G06F 13/1673* (2013.01)

(58) Field of Classification Search
CPC .. G06F 3/0659; G06F 3/0658; G06F 13/1673; G06F 12/06
See application file for complete search history.

(56) References Cited

U.S. PATENT DOCUMENTS

| | | | |
|---|---|---|---|
| 10,121,553 B2 | 11/2018 | Harari | |
| 11,513,729 B1 | 11/2022 | Ben-Yehuda et al. | |
| 11,561,911 B2 | 1/2023 | Norman et al. | |
| 11,580,038 B2 | 2/2023 | Norman et al. | |
| 11,670,620 B2 | 6/2023 | Quader et al. | |
| 2012/0311246 A1 | 12/2012 | McWilliams et al. | |
| 2017/0031619 A1* | 2/2017 | Luan ..................... | G06F 3/0673 |

(Continued)

OTHER PUBLICATIONS

PCT Search Report and Written Opinion, PCT/US2023/70949, Jan. 12, 2024, 11 pages.

*Primary Examiner* — Chie Yew

(57) ABSTRACT

A memory system includes a memory device including an array of storage transistors for storing data where the storage transistors are organized in multiple memory banks, each memory bank including multiple memory pages; and a control circuit configured to interact with the memory device to perform read and write operations. The control circuit includes a read queue configured to store active read requests for reading data from the memory device, a write queue configured to store active write requests for writing data to the memory device, and a write staging buffer configured to store pending write requests received by the control circuit and to transfer the pending write requests to the write queue to maximize the number of active write requests that are addressed to different memory banks of the memory device.

28 Claims, 12 Drawing Sheets

(56) References Cited

U.S. PATENT DOCUMENTS

| | | |
|---|---|---|
| 2018/0239720 A1* | 8/2018 | Kanoh .................... G11C 7/00 |
| 2021/0247910 A1 | 8/2021 | Kim et al. |
| 2022/0004321 A1 | 1/2022 | Jiang et al. |
| 2022/0254390 A1 | 8/2022 | Gans et al. |
| 2023/0027837 A1 | 1/2023 | Petti et al. |
| 2023/0187413 A1 | 6/2023 | Yoshihara et al. |
| 2023/0195314 A1 | 6/2023 | Yoshihara et al. |

\* cited by examiner

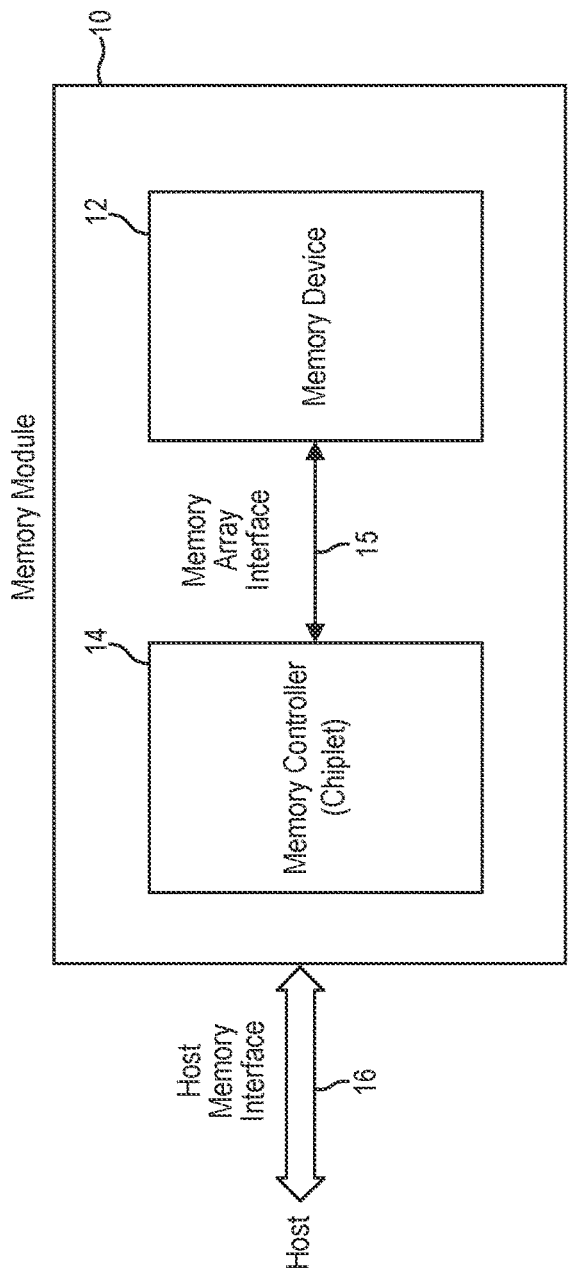
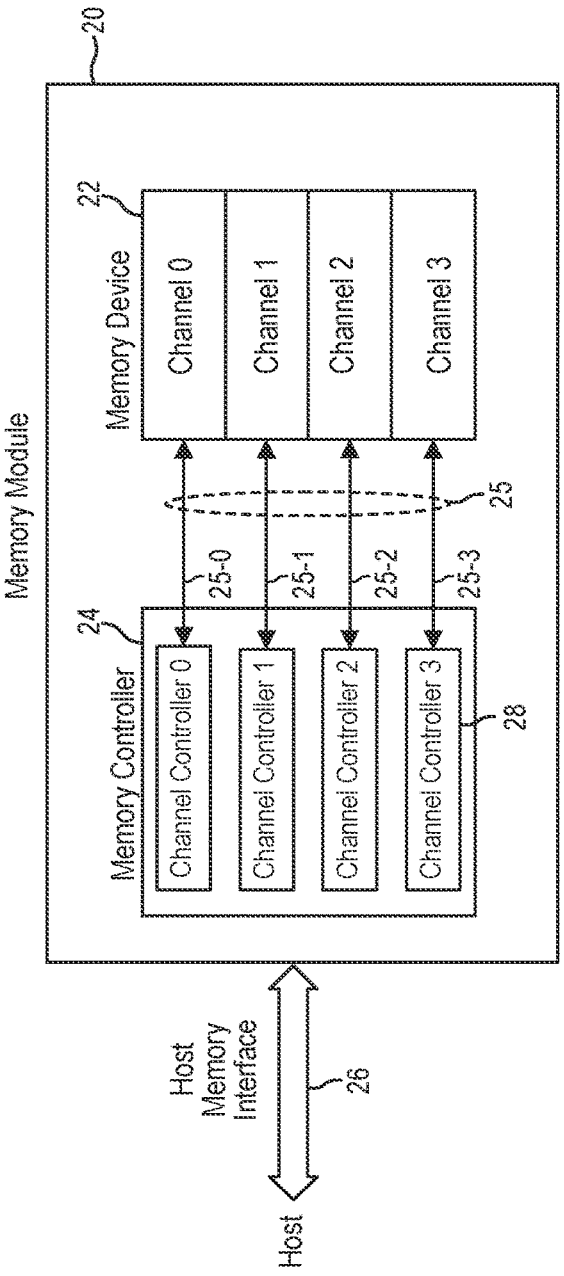
FIG. 1(a)
FIG. 1(b)

MEMORY CONTROLLER INCLUDING A WRITE STAGING BUFFER TO MANAGE WRITE REQUESTS FOR A HIGH CAPACITY MEMORY CIRCUIT WITH LARGE NUMBER OF INDEPENDENTLY ACCESSIBLE MEMORY BANKS

CROSS REFERENCE TO RELATED APPLICATIONS

This application claims priority to U.S. Provisional Patent Application No. 63/370,359, entitled MEMORY CONTROLLER FOR A HIGH CAPACITY MEMORY CIRCUIT WITH LARGE NUMBER OF INDEPENDENTLY ACCESS MEMORY BANKS, filed Aug. 3, 2022, which is incorporated herein by reference in its entirety.

The present application is related to: (1) U.S. patent application Ser. No. 18/059,971, entitled "Memory System Implementing Write Abort Operation For Reduced Read Latency," filed on Nov. 29, 2022, and (2) U.S. patent application Ser. No. 18/059,974, entitled "Memory Device Including Arrangement of Independently And Concurrently Operable Tiles of Memory Transistors," filed on Nov. 29, 2022, which applications are hereby incorporated by reference in their entireties.

FIELD OF THE INVENTION

The present invention relates to a memory controller configured to control and operate a high capacity and high bandwidth memory circuit and, in particular, to a memory controller incorporating a write staging buffer operating cooperatively with a write queue to control write operations being performed at specific addresses in a planar or 3-dimensional array of the memory circuit.

BACKGROUND OF THE INVENTION

High density memory arrays, such as 3-dimensional arrays of NOR memory strings ("3-D NOR memory arrays"), have been disclosed in, for example, U.S. Pat. No. 10,121,553 ("the '553 patent"), entitled "Capacitive-Coupled Non-Volatile Thin-film Transistor NOR Strings in Three-Dimensional Arrays," filed on Aug. 26, 2016, and issued on Nov. 6, 2018. In the '553 patent, storage or memory transistors are organized as 3-dimensional arrays of NOR memory strings formed above a planar surface of a semiconductor substrate. In addition to providing high memory density and capacity, these 3-D NOR memory arrays may be operated to provide memory circuits at highly desirable speeds that rival conventional memory circuits of much lower circuit densities and significantly higher power dissipation, e.g., as dynamic random-access memories ("DRAMs"). The '553 patent is incorporated hereby by reference in its entirety.

Furthermore, the memory circuits in the '553 patent are sometimes referred to as "quasi-volatile memory" or "QV memory". Like those of a non-volatile memory (NVM), the memory cells of the QV memory in the '553 patent each store a data bit as an electric charge in a charge storage material (e.g., ONO). Also referred to as charge trapping. Because of the nature of the charge-storage layer, a typical charge-trapping QV memory cell has a much longer data retention time than a DRAM cell and, hence, requires a lower refresh rate than the DRAM cell. For example, a typical DRAM system is designed to be refreshed every 64 milliseconds; a QV memory with a comparable effective access performance, however, may be refreshed less frequently (e.g. every 10 minutes). The reduced refresh rate provides the QV memory great advantages in a lower power requirement, a reduced heat dissipation, and a higher memory availability which delivers a better host performance.

SUMMARY OF THE INVENTION

The present disclosure discloses a memory system and method for managing write requests where a write staging buffer operates cooperatively with a write queue to issue write commands to specific address within the memory device in a manner that maximizes the write bandwidth of the memory system while maintaining data integrity, substantially as shown in and/or described below, for example in connection with at least one of the figures, as set forth more completely in the claims.

In embodiments of the present disclosure, a memory system includes a memory device including an array of storage transistors for storing data, the storage transistors being organized in multiple of memory banks, each memory bank including multiple memory pages; and a control circuit configured to interact with the memory device to perform read and write operations. The control circuit includes a read queue configured to store active read requests for reading data from the memory device, a write queue configured to store active write requests for writing data to the memory device, and a write staging buffer configured to store pending write requests received by the control circuit and to transfer the pending write requests to the write queue to maximize the number of active write requests that are addressed to different memory banks of the memory device.

These and other advantages, aspects and novel features of the present invention, as well as details of an illustrated embodiment thereof, will be more fully understood from the following description and drawings.

BRIEF DESCRIPTION OF THE DRAWINGS

Various embodiments of the invention are disclosed in the following detailed description and the accompanying drawings. Although the drawings depict various examples of the invention, the invention is not limited by the depicted examples. It is to be understood that, in the drawings, like reference numerals designate like structural elements. Also, it is understood that the depictions in the FIGS. are not necessarily to scale.

FIG. 1(a) illustrates a memory module which incorporates a memory controller in embodiments of the present invention.

FIG. 1(b) illustrates a memory module with a memory device configured with independently accessed memory channels in embodiments of the present invention.

DETAILED DESCRIPTION OF THE INVENTION

Figure 2:
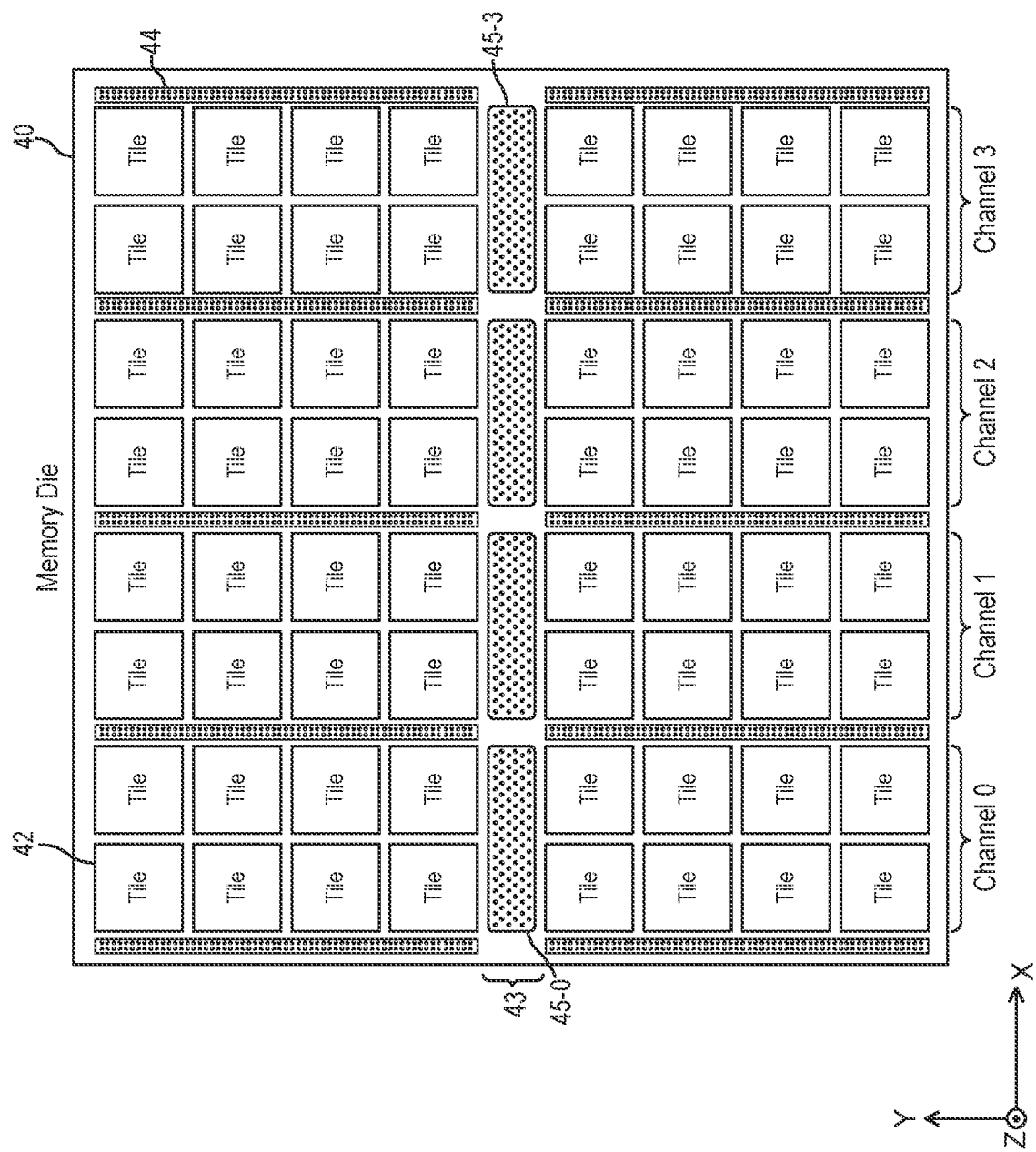
FIG. 2 is a top view of a semiconductor memory die illustrating the tile-based organization of storage transistors in embodiments of the present invention.

In embodiments of the present invention, a memory controller interacts with a memory device to perform read and write operations where the memory device is organized in multiple independently accessible memory banks. The memory controller is configured to issue to the memory device write commands where each write command causes the memory device to initiate a write operation to a particular memory bank in the memory device. According to embodiments of the present invention, the memory controller includes a write staging buffer operating cooperatively with a write queue in the memory controller to implement a write request staging scheme to issue write commands to the memory device in a manner that maximizes the write bandwidth of the memory system. In one embodiment, the write staging buffer stores incoming write requests and transfers write requests to the write queue according to the write request staging scheme which minimizes banks conflicts at the write queue or maximizes the number of write requests to different banks in the write queue. In this manner, the memory system of the memory device and the memory controller can realize a large write bandwidth even when the memory device may have a long write latency.

In the present description, the terms "semiconductor memory die" or "memory die" or "semiconductor memory device" or "memory device" are used interchangeably to refer to a memory circuit that includes storage transistors formed directly or indirectly on a semiconductor substrate. In embodiments of the present disclosure, the semiconductor memory device includes three-dimensional arrays of storage transistors. In some embodiments, the semiconductor memory device is constructed using three-dimensional arrays of NOR memory strings formed over a semiconductor substrate, as described in the aforementioned '553 patent. In embodiments of the present disclosure, the semiconductor memory device includes a memory array of quasi-volatile storage transistors and is sometimes referred to as a "quasi-volatile memory" ("QV memory"). In the present description, a NOR-type memory string includes storage transistors formed above a planar surface of a semiconductor substrate that share a common source region and a common drain region, where each storage transistor can be individually addressed and accessed. In some examples, a three-dimensional array can be formed with the NOR memory strings provided on multiple planes (e.g., 8 or 16 planes) above the semiconductor substrate, with the NOR memory strings on each plane arranged in rows.

In the present description, the term "storage transistor" is used interchangeably with "memory transistor" to refer to the transistor device formed in the memory device described herein. In some examples, the memory device in the present disclosure including NOR memory strings of randomly accessible memory transistors (or storage transistors) can have applications in computing systems as the main memory where the memory locations are directly accessible by the processors of the computer systems, for instance, in a role served in the prior art by conventional random-access memories (RAMs), such as dynamic RAMs (DRAMS) and static RAMs (SRAMs). For example, the memory device in the present invention can be applied in computing systems to function as a random-access memory to support the operations of microprocessors, graphical processors and artificial intelligence processors. In other examples, the memory device in the present disclosure is also applicable to form a storage system, such as a solid-state drive or replacing a hard drive, for providing long term data storage in computing systems.

In some embodiments, the semiconductor memory device is formed using thin-film storage transistors implementing charge trapping as the data storage mechanism where data is stored in a charge storage film in each storage transistor. For examples, the charge storage film includes a tunneling dielectric layer, a charge trapping layer and a blocking layer, which can be implemented as a multilayer including silicon oxide, silicon nitride, and silicon oxide, arranged in this order and referred to as an ONO layer. An applied electrical field across the charge storage film adds or removes charge from charge traps in a charge trapping layer of the charge storage film, altering the threshold voltage of the storage transistor to encode a given logical state to the storage transistor.

In other embodiments, the semiconductor memory device is formed using ferroelectric field-effect transistors as the storage transistors. More specifically, a ferroelectric field-effect transistor (referred herein as ferroelectric transistors or FeFETs) is formed by using a ferroelectric material as the gate dielectric layer between the gate conductor and the channel of a field-effect transistor. The ferroelectric transistor realizes memory function by storing data as polarization states in the ferroelectric gate dielectric layer (also referred to as the "ferroelectric dielectric layer"). In particular, a voltage applied to the gate conductor induces electrical polarization in the ferroelectric dielectric layer, which polarization can be reversed with application of a voltage in the opposite polarity. The induced polarization states of the ferroelectric dielectric layer change the threshold voltage of the ferroelectric transistor. The change or shift in the threshold voltage of the ferroelectric transistor due to the different polarization states can be used to represent data in different logical states. For example, two logical states (e.g., "0" and "1") can be represented by the higher and lower threshold voltages of the ferroelectric transistor as a result of two induced electrical polarization states in the ferroelectric dielectric layer. Three-dimensional arrays of NOR memory strings of thin-film ferroelectric transistors have been disclosed in, for example, U.S. patent application Ser. No. 17/812,375, entitled "3-Dimensional Memory String Array Of Thin-Film Ferroelectric Transistors," of Christopher J. Petti et al., filed on Jul. 13, 2022, which application is incorporated herein by reference in its entirety.

In some embodiments, the ferroelectric dielectric layer is a doped hafnium oxide layer. In some examples, the doped hafnium oxide layer may include one or more of: zirconium-doped hafnium oxide (HZO), silicon-doped hafnium oxide (HSO), aluminum zirconium-doped Hafnium oxide (HfZrAlO), aluminum-doped hafnium oxide (HfO2:Al), lanthanum-doped hafnium oxide (HfO2:La), hafnium zirconium oxynitride (HfZrON), hafnium zirconium aluminum oxide (HfZrAlO) and any hafnium oxide that includes zirconium impurities.

In yet other embodiments, the 3-dimensional array of NOR memory strings is formed using junctionless ferroelectric storage transistors. That is, the ferroelectric storage transistors do not include p/n junction as the drain or source region in the channel. Instead, the drain and source regions are formed by conductive layers, such as a metal layer, and the semiconductor channel region is formed of an amorphous oxide semiconductor material, such as indium gallium zinc oxide (IGZO). In some examples, the source/drain conductive layers can be formed from a metal layer or a low resistivity metallic conductive material, such as molybdenum (Mo), tungsten (W), tungsten nitride (WN), ruthenium or titanium tungsten alloy (TiW). In some examples, the semiconductor channel region may be formed from other oxide semiconductor materials, such as indium zinc oxide (IZO), indium tungsten oxide (IWO), or indium tin oxide (ITO).

FIG. 1(a) illustrates a memory module which incorporates a memory controller in embodiments of the present invention. Referring to FIG. 1(a), a memory module 10 include a memory device 12 which may be formed from one or more semiconductor memory dies, each semiconductor memory die with memory arrays of storage transistors formed therein. The memory module 10 further includes a memory controller die 14 ("memory controller") with control circuity formed therein. In cases where the memory device 12 includes multiple semiconductor memory dies, the semiconductor memory dies may be connected by interconnect structures (e.g., through-silicon vias (TSV)). The memory device 12 communicates with the memory controller 14 through a memory array interface 15. In some embodiments, the memory array interface 15 is a high-bandwidth data interface implemented on interconnect structures that connect the memory device 12 to the controller die 14, such as TSV, bridge or interposer chips, or hybrid bonds. The memory controller 14 also includes one or more external interfaces, such as memory interfaces for host access and other system functions. For example, the memory controller 14 includes a host interface 16 for communicating with a host processor, such as to receive requests from the host to read data from or write data to the memory module 10 and to transmit responses to the host, such as write completion response or the read data.

In the present description, a "memory module" refers to one or more semiconductor memory dies coupled to an associated memory controller die to form a high density and high capacity memory system. Each semiconductor memory die may include one or more planar or three-dimensional arrays of storage transistors, also referred to as memory cells, for storing memory data. In the present description, the memory controller die is sometimes referred to as "memory controller," "controller die," "memory control circuit," "control circuit" or "chiplet," and includes control circuitry for accessing and operating the memory devices and performing other memory control functions, such as data routing and error correction. The memory control circuit may also include one or more external interfaces, such as a memory interface for host access. In some embodiments, the memory module is built as a multi-die structure with the memory controller formed on one semiconductor die and the memory device formed on separate semiconductor die(s). The memory die(s) and the memory controller die may be integrated using a variety of integration techniques, such as using TSVs, hybrid bonds, exposed contacts, bridge chips, interposers, printed circuit boards and other suitable interconnect techniques, especially techniques for high density interconnects.

As thus configured, the memory module 10 of the present disclosure integrates one or more semiconductor memory dies with one memory controller die to realize a high capacity memory system with faster memory controller operations and faster memory performance. In addition, the memory dies and the controller die can be separately fabricated using specialized manufacturing processes to optimize the performance of each integrated circuit. More specifically, the memory module 10 can be built using a fabrication process that is optimized for memory circuits and a fabrication process that is optimized for the memory controller. For example, the memory controller may be fabricated using a manufacturing process that is optimized for forming low-voltage and fast logic circuits. In this manner, the performance of the memory circuit and the performance of the memory controller can be individually optimized to realize a memory module 10 with high capacity, high bandwidth and faster memory operations.

In one embodiment, the memory controller is formed as a discrete semiconductor die or integrated circuit customized for use as a memory controller, for example, as an application-specific integrated circuit. In another embodiment of the present invention, the memory controller may be implemented in a general purpose integrated circuit (e.g. a central processing unit (CPU), a graphic processing unit (GPU), a communication chip, or a field programmable gate array). The functional blocks forming the control circuitry of the memory controller are embedded in the general purpose integrated circuit and the memory array interface of the memory controller are electrically and physically connected to the memory device, using one of the techniques described above. As thus configured, the embedded memory controller does not include a host interface circuit but can communicate directly with the logic circuits through interconnect lines formed in the general purpose integrated circuit. Such a configuration is sometimes referred to as "in memory compute." In memory compute is particularly desirable in artificial intelligence and machine learning applications that are data intensive, and which require a great deal of memory in close proximity to the CPU or GPU core processor, which is embedded with the memory controller functional blocks.

FIG. 1(b) illustrates a memory module with a memory device configured with independently accessed memory channels in embodiments of the present invention. Referring to FIG. 1(b), a memory module 20 includes a memory device 22 in communication with a memory controller 24 through a memory array interface 25. The memory device 22 may include one or more semiconductor memory dies that are connected together through interconnect structures, such as TSV. The memory controller 24 includes one or more external interfaces, such as a memory interface 26 for communicating with a host.

In embodiments of the present disclosure, the memory device 22 is partitioned into N independently accessed memory channels, N being an integer greater than 1. In one embodiment, when the memory device 22 includes multiple memory dies, each memory die is partitioned into N number of partitions and corresponding partitions across all of the memory dies are grouped to form a memory channel. In the present embodiment, four memory channels are provided, illustrated as memory channels Ch 0 to Ch 3. In other embodiments, the memory module 20 may be partitioned into a suitable number of memory channels based on factors such as bandwidth and/or reliability requirements. As thus configured, each memory channel operates independently of each other to provide memory functions using the storage transistors within the channel partitions. The memory controller 24 operates each memory channel independently and in parallel of the other channels to perform memory operations, such as read or write operations. The memory array interface 25 provides individual memory channel interface for each memory channel. That is, the memory channels Ch 0 to Ch 3 are independently accessible over respective memory channel interfaces 25-0 to 25-3. The memory controller 24 accesses each memory channel Ch n over the respective memory array interface 25-*n*. By partitioning and operating the memory device 22 as individually accessed memory channels, the memory module 20 is capable of providing high bandwidth data transfer for the host.

With the memory device 22 partitioned into N memory channel, the memory controller 24 includes a channel controller 28 that is instantiated N times to provide one channel controller for each memory channel. In the present example, 4 instances of the channel controller 28 are provided, including Channel Controller 0 to Channel Controller 3, for the four memory channels of the memory device 22. Each channel controller 28 communicates with a memory channel over the respective memory channel interface 25-*n*. In this manner, each memory channel Ch 0 to Ch 3 of the memory device 22 is independently accessible and the memory channels Ch 0 to ch3 can be accessed in parallel to realize high bandwidth memory access.

In embodiments of the present invention, the memory device in the memory module includes one or more semiconductor memory dies where each semiconductor memory die includes planar or three-dimensional arrays of thin-film storage transistors that are organized as a 2-dimensional array of memory banks, also referred to as "tiles." Furthermore, in some embodiments, each memory bank is organized into multiple memory pages of storage transistors, each memory page including a subset of storage transistors in the memory bank. For example, a memory page may include 512 storage transistors and a memory bank may include over 120 K memory pages of storage transistors. As thus organized, the storage transistors in the memory device are accessed in units of a memory page having a given byte size, that is, each read or write operations to the memory device are performed in units of a memory page. In one example, the memory device may be accessed in a memory page size of 64 byte or 512 bits.

FIG. 2 is a top view of a semiconductor memory die illustrating the tile-based organization of storage transistors in embodiments of the present invention. Referring to FIG. 2, a semiconductor memory die 40 includes three-dimensional arrays ("memory arrays") of thin-film storage transistors where the memory arrays are organized as a 2-dimensional array of "tiles" or memory banks 42 (i.e., the tiles are arranged in rows and columns) formed above a planar semiconductor substrate. Each tile 42 includes a three-dimensional array of thin-film storage transistors. In the present description, a tile 42 in the memory die 40 refers to a regular array of addressable modular structure of memory cells placed in a regular manner. In some embodiments, each tile 42 includes a memory array of quasi-volatile storage transistors that are organized as 3-dimensional arrays of NOR memory strings. The semi-autonomous operation of each tile is enabled by the design of the control logic and the power network of the memory device, as described below.

In memory die 40, each tile 42 can be configured to be individually and independently addressed. Alternately, larger memory segments (e.g., a row of tiles or a 2-dimensional block of tiles) may be created and configured to be addressed together. In the present description, one or more tiles are configured to form an operating unit, which is referred to as a "memory bank" or a "bank." In other words, a memory bank may include a single tile 42 or a block of tiles, such as a row or a section of tiles. As thus configured, the tile 42 is a building block that allows flexibility in configuring the memory module to adapt to application requirements. In the present description, a memory bank consists of one tile.

The support circuitry of the memory die 40 for the thin-film storage transistors of each tile are formed on or in the planar semiconductor substrate under the tiles. In some embodiments, the support circuitry for each tile are provided for modularity in the portion of the semiconductor substrate underneath each respective tile. The tile-based support circuits are referred to as "circuit under array" ("CuA") and may include various voltage sources for power supply, ground, programming, erase or read voltages, sense amplifiers, data latches and registers, logic circuits, analog circuits, and other circuits used in memory operations. Example logic circuits include timing control, address decoders, redundancy logic and control circuits. Example analog circuits include data driver, word line and bit line drivers and select transistors, and bias control transistors. Furthermore, in embodiments of the present disclosure, each CuA includes a state machine or a sequencer to execute instructions to be carried out at the associated tile. In embodiments of the present invention, the tile-based support circuits are formed in the semiconductor substrate using a first fabrication process and then the semiconductor substrate with the tile-based support circuits formed thereon is provided in a second fabrication process to form the thin-film storage transistors.

As thus configured, each tile 42 in the memory die 40 operates as a semi-autonomous mini-array of memory cells within the memory die 40. That is, each tile 42 can be operated semi-autonomously and independently of other tiles in the memory die 40. The tiles 42, each with its own associated CuA, enable concurrent memory access to a large number of storage transistors in memory die 40 to increase memory throughput and reduce latency. In other words, each tile or memory bank 42 performs one memory operation at a time, such as a write operation to or a read operation from storage transistors of the selected memory address in the tile. Memory operations to the same tile (or memory bank) are performed in series, that is, one after another, while memory operations to different tiles can be performed in parallel or currently. In some embodiments, two neighboring tiles may share certain support circuitry in the CuA. For example, a tile may include a set of sense amplifiers which is shared with a neighboring tile. Each tile, when selected for access, uses its own set of sense amplifiers and the set of sense amplifiers in the neighboring tile. In this case, the neighboring tile, for which the set of sense amplifiers has been borrowed for use, may be marked as non-accessible until the operation on the borrowed sense amplifiers is complete.

In the embodiment shown in FIG. 2, the memory die 40 is illustrated as including tiles arranged in 8 rows and 8 columns. The embodiment shown in FIG. 2 is illustrative only and not intended to be limiting. In one example, a memory die may include 1024 tiles arranged in 32 rows and 32 columns or 2048 tiles arranged in 64 rows of 32 columns. The number of tiles and the arrangement of tiles in the memory die 40 can be selected based on various design factors, such as the size and dimension of the memory die or the placement of interconnect structures.

In embodiments of the present disclosure, the memory die 40 is divided into multiple partitions to form separate memory channels by dividing the two-dimensional array of tiles. In the present embodiment, the memory die 40 is divided by the tile columns into four partitions, forming four memory channels Ch 0 to Ch 3. In the present example, each memory channel (Ch 0 to Ch 3) includes two columns of 8 tiles, for a total of 16 tiles per memory channel. In another example, in a memory die with 1024 tiles, the memory die may be divided by tile columns into 8 partitions, forming eight memory channels, with each memory channel including four columns of 32 tiles, for a total of 128 tiles per memory channel.

In embodiments of the present disclosure, the memory die 40 includes a data interface area 43 for forming the interconnect structures 45 for connection to the memory controller. In the present embodiment, the data interface area is provided in the middle of the memory die, positioned between the two halves of the tile columns. Furthermore, to support the memory channel configuration, the interconnect structures 45 are partitioned according to the channel configuration to provide interconnect structures 45-0 to 45-3 for each memory channel Ch 0 to Ch 3. For example, the interconnect structures 45 are TSVs and each memory channel is provided with a dedicated set of interconnect structures or TSVs for transferring data for that memory channel to and from the memory controller. As shown in FIG. 2, the memory die 40 may include additional sets of interconnect structures 44 for supplying the power and ground connections to the memory arrays formed in the tiles 42. In some embodiments, multiple memory dies 40 are used to form a memory stack, which is then stacked on the memory controller to form a memory module. In a memory stack, a memory channel is formed by the tiles in the same channel partition across all of the memory dies in the memory stack.

In embodiments of the present disclosure, the write request staging scheme of the present invention is particularly advantageous when applied to a memory device organized as a 2-dimensional array of memory banks, each memory bank including an array of thin-film storage transistors, such as a three-dimensional arrays of thin-film storage transistors. In other embodiments, the write request staging scheme of the present invention can be applied to memory modules of other types of memories, such as DRAMs, SRAMs or ferroelectric memory arrays or other memory types, including volatile and non-volatile memories. In the following description, references to "a memory module" or "a memory system" refer to a memory module or system of any memory type. References to a memory module with quasi-volatile memory transistors are illustrative only and not intended to be limiting. The write request staging scheme of the present invention may be incorporated in memory modules implemented using any memory types. In the present description, a quasi-volatile memory array refers to an array of quasi-volatile memory cells where the quasi-volatile memory cells have a much longer data retention time than DRAM cells and requiring a lower refresh rate than DRAM cells. For example, a typical DRAM cell may need to be refreshed every 32 milliseconds; a quasi-volatile memory with a comparable effective access performance, however, may be refreshed every 10 minutes.

Embodiments of the present invention provides a memory controller that implements a write request staging scheme to maximize the write bandwidth of the memory module. In some embodiments, each memory channel controller 28 in the memory controller 24 (FIG. 1(*b*)) implements the write request staging scheme to operate on the associated memory channel. In the following description, the write request staging scheme is described as being implemented in a memory channel controller. It is understood that in the case the memory controller is coupled to operate a memory device without channel partitioning, such as the memory module 10 in FIG. 1(*a*), the write request staging scheme will be implemented in the memory controller itself. In other words, when the memory device has only one channel, then the memory controller can be considered as having a single channel controller.

In some cases, the memory device may have asymmetric read and write latency. In some cases, the time to write data to the storage transistors of the selected memory address may be longer as compared to the read latency (i.e. the time to obtain read data from the storage transistors of the selected memory address). For example, the read latency may be 70 ns while the write latency may be 300 ns. The long write latency is usually due to the write operation including multiple steps, such as erase and program operations, or a verification operations. As a result of the tile-based memory configuration and the semi-autonomous operation of different tiles or memory banks in the memory device, the memory controller can realize a high write bandwidth by having multiple write operations in progress in parallel across multiple memory banks. However, the write bandwidth can become limited or can be reduced when the memory controller issues multiple memory requests to the same memory banks, especially multiple write operations, resulting in bank conflicts. In embodiments of the present invention, the memory channel controller implements the write request staging scheme to control the write operations in the memory device to minimize or reduce bank conflicts and maximize bank usage, that is, to maximize the number of memory banks having write operations in parallel. In this manner, the memory controller can realize a large write bandwidth even when the memory device may have a long write latency.

Figure 3:
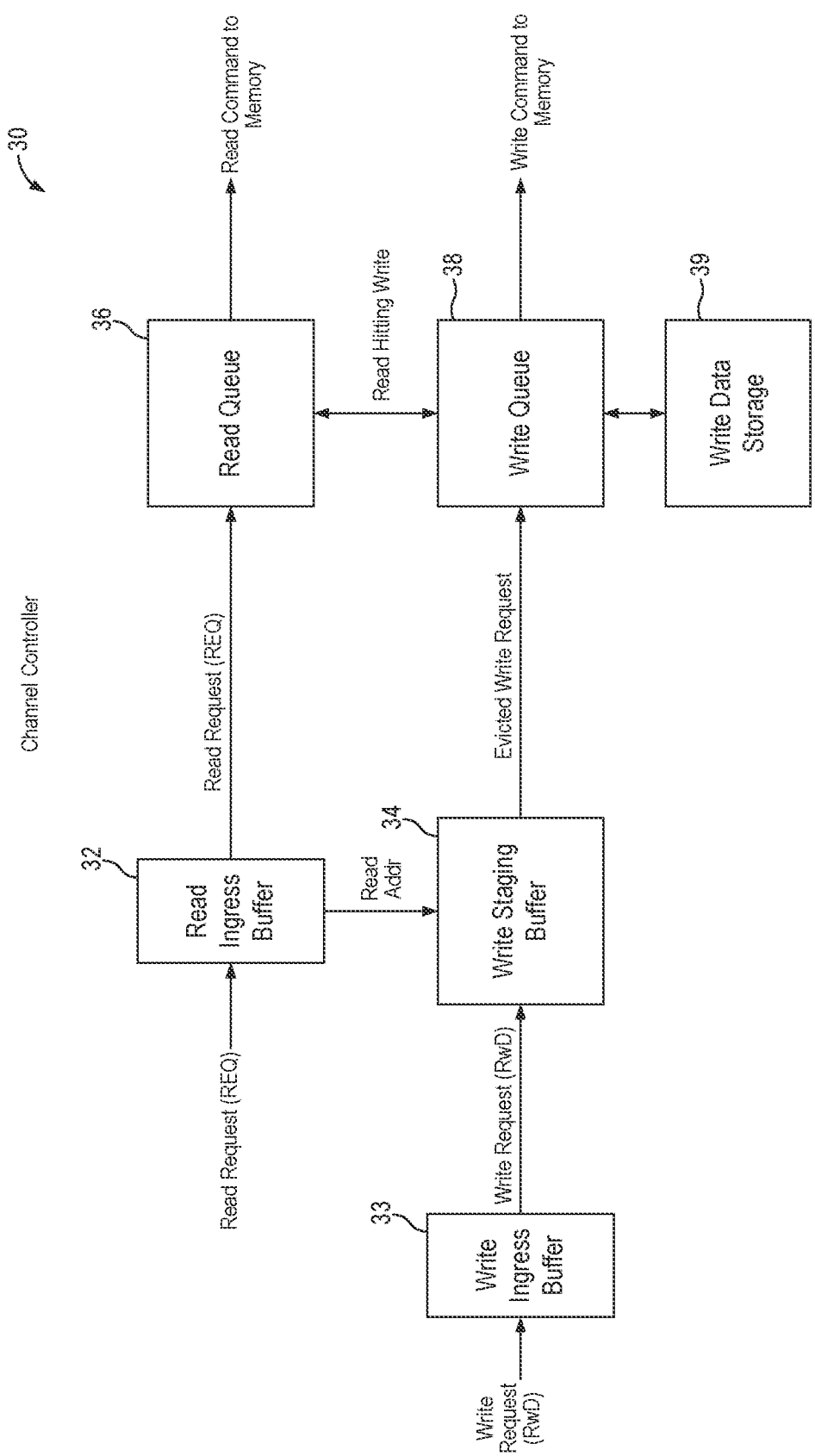
FIG. 3 is a representative block diagram of a memory channel controller in embodiments of the present invention.

FIG. 3 is a representative block diagram of a memory channel controller in embodiments of the present invention. In particular, FIG. 3 illustrates a simplified block diagram of the memory channel controller and includes only elements necessary to illustrate the implementation of the write request staging scheme according to embodiments of the present invention. It is instructive to note that the memory channel controller includes other elements not shown in FIG. 3 to complete the operation of the controller. A detailed memory channel controller architecture will be explained in more detail below. Referring to FIG. 3, a memory channel controller 30 ("channel controller") receives incoming read or write requests, such as from a host processor, and stores the requests into separate ingress buffers. The incoming read/write requests may be processed through an address translation logic circuit to translate the logical address from the host process to the physical address of the memory device, as will be described in more details below. In some examples, the memory channel controller 30 communicates with the host over a PCIe 5.0 serial bus using the CXL (Compute Express Link™) protocol. Under the CXL protocol, the host processor issues requests without data (REQ)

as the read requests and requests with data (RwD) as the write requests with write data. Furthermore, under the CXL protocol, the memory controller 30 issues responses with data (DRS) as the read data and responses without data (NDR) as the write completion response. The use of CXL protocol in the present description is illustrative only and not intended to be limiting.

In the present embodiment, the channel controller 30 includes a read ingress buffer 32 for storing incoming read requests and a write ingress buffer 33 for storing incoming write requests. The read requests are transferred from the read ingress buffer 32 to a read queue 36, such as on a first-in-first-out basis. The read queue 36 stores active read requests and generates read commands that are sent to the memory device to execute the read operations at the memory addresses designated by the active read requests.

In embodiments of the present disclosure, incoming write requests stored in the write ingress buffer 33 are first provided to and stored in a write staging buffer 34. The write staging buffer 34 stores pending write requests and forwards the pending write requests to the write queue 38 under a write request staging scheme that prioritizes forwarding pending memory requests to different memory banks. The write queue 38 stores active write requests and generates write commands that are sent to the memory device to execute the write operations at the memory addresses designated by the active write requests. In operation, the memory channel controller 30 manages or keep the order of the active read requests and the active write requests stored in the read queue 36 and the write queue 38 so that order of read and write operations is maintained.

In the present embodiment, the write queue 38 is coupled to a write data storage 39 which stores the write data associated with the write requests. In one embodiment, the write data storage 39 is a fast access array that stores the write data and the valid byte indicator bits (also referred to as byte enable bits) of all the active write requests in the write queue 38. The use of write data storage 39 is optional and may be omitted in other embodiments. The write queue 38 may be configured to store the write request with the write data. Furthermore, in the present description, "write data" refers to at least the memory data provided by the host or the external system and to be stored into the storage transistors at the designated write memory address. The write data may further include metadata also provided by the host to be stored with the memory data. In some embodiments, the write data may include error correction code, generated by the memory controller to perform error correction on the stored data. In that case, the error correction code is appended to the memory data and is stored with the memory data at the designated write memory address. The error correction code enables error correction to be performed as needed when the stored memory data is read out.

More specifically, the write staging buffer 34 operates cooperatively with the write queue 38 to maximize the write bandwidth of the memory system. The write staging buffer 34 forwards write requests to the write queue 38 under a write request staging scheme that prioritizes memory requests to different memory banks. In particular, the write staging buffer 34 stores pending write requests and forwards the pending write requests to the write queue 38 in a manner that maximizes the number of write requests to different memory banks being sent to the write queue. In order words, the write staging buffer 34 forwards pending write requests in a manner so as to minimize bank conflicts at the write queue 38. In the present description, bank conflicts refer to multiple active write requests in the write queue 38 that are destined for the same memory bank. In the present example, each memory bank in the memory device is capable of performing only one memory operation at a time; however, different memory banks in the memory device operate semi-autonomously to perform memory operations in parallel. Accordingly, a second write request to the same memory bank as a first write request would have to wait until the first write request is completed before the second write request can be executed. In the case the write latency of the memory device is long, the second write request to the same memory bank may have to wait for a long time in the write queue 38, which has the effect of reducing the write bandwidth of the memory system. According to the write request staging scheme of the present invention, the write queue 38 is provided with active write requests that are designated to as many different memory banks as possible and the write queue 38 issues write commands to the memory device to execute write operations in parallel at as many different memory banks as possible. In memory channel controller 30, the write staging buffer 34 operates advantageously to reduce bank conflicts at the write queue 38 so that the memory device can operate at the maximum write bandwidth.

In embodiments of the present disclosure, the write staging buffer 34 implements the write request staging scheme to transfer pending write requests to the write queue 38. In some embodiments, the write request staging scheme implements a set of eviction rules. The write staging buffer 34 transfers or evicts a pending write request to the write queue 38 in response to the set of eviction rules. In one embodiment, the write request staging scheme includes a first eviction rule where the write staging buffer will evict a pending write request to the write queue when the memory bank associated with the pending write request is idle, that is, the memory bank does not have an active write request in the write queue or an active read request in the read queue. The write staging buffer continues to transfer or evict pending write requests to the write queue as long as the associated memory banks are idle. A pending write request associated with a memory bank that is currently busy will remain in the write staging buffer until the memory bank becomes idle. In the present description, a memory bank is busy when there is currently an active write request in the write queue or an active read request in the read queue to that memory bank. The first eviction rule aims to achieve a desirable operating condition of the write queue having only active write requests for different memory banks of the memory device.

In other embodiments, the write request staging scheme may include a second eviction rule where the write staging buffer will evict a pending write request that has aged past a maximum time threshold, regardless of the status of the memory bank associated with the pending write request. That is, when a pending write request has remained in the write staging buffer for longer than the maximum time threshold, the write staging buffer will evict the aged pending write request to the write queue even if the memory bank associated with the aged pending write request is not idle. This type of eviction is sometimes referred to as a "force evict"—referring to the eviction of the pending write request from the write staging buffer regardless of whether the memory bank associated with the write request is busy or idle.

In another embodiment, the write request staging scheme includes a third eviction rule where the write staging buffer will evict a pending write request to the write queue when the write staging buffer is near full, regardless of the status of the memory bank associated with the pending write request. This type of eviction is also referred to as a "force evict." In some cases, the write staging buffer includes storage areas assigned to each memory bank of the memory device. Accordingly, the third eviction rule is configured to cause the write staging buffer to evict a pending write request for a certain memory bank when the storage area for that memory bank is near full or the capacity of the storage area is near full. Alternately, each storage area for a memory bank is associated an occupancy threshold. The third eviction rule is configured to cause the write staging buffer to evict a pending write request for a certain memory bank when the pending write requests stored in the storage area of that memory bank has exceeded the occupancy threshold.

In the embodiment shown in FIG. 3, the write staging buffer further implements other eviction rules for other operating conditions that may occur in the memory channel controller 30. For example, an eviction rule may be implemented when a read request comes in while there is a pending write request for the same memory address in the writing staging buffer. In some embodiments, the write request staging scheme includes a fourth eviction rule to handle the operating condition of a read request at a memory address matching that of a pending write request in the write staging buffer. In particular, the read ingress buffer 32 provides the address of the incoming read requests ("read address") to the write staging buffer 34. The write staging buffer 34 performs address matching to determine if the read address of an incoming read request matches any of the memory addresses of the pending write requests. In response to the read address of an incoming read request matching an address of a pending write request, the write staging buffer evicts or transfers that pending write request to the write queue 38. This eviction is also referred to as a "force evict" because the eviction of the pending write request occurs regardless of whether the memory bank associated therewith is busy or idle. Following the pending write request being evicted, the read ingress buffer 32 transfers the read request having the matching address to the read queue 36. The memory channel controller 30 is configured to maintain the order of the read requests and write requests in the read queue and the write queue. In particular, the memory channel controller 30 maintains the temporal order of the read requests and write requests so that memory data integrity is ensured. For example, a read request that arrives before a write request to the same memory address will receive the stored memory data, also referred to as the "old data," and a read request that arrives after a write request to the same memory address should receive the new memory data of the write request.

In operation, the memory channel controller 30 compares the memory address of the read requests in the read queue 36 to the memory address of the write requests in the write queue 38. In response to a read request in the read queue 36 matching the memory address of a write request in the write queue 38 (and the read request arrives after the write request), the memory channel controller 30 is configured to obtain the read data for the read request from the write queue. More specifically, in some embodiments, the read request may be satisfied by obtaining as the read data the write data from the write data storage 39 associated with the matching write request. In this manner, the write request staging scheme enables the memory channel controller to preserve the order of the write and read requests and ensure that a read request the comes on after a write request to the same memory address will receive the correct memory data.

In other embodiments, the write staging buffer may further implement other eviction rules, such as for handling a partial write request matching a pending write request, as will be explained in more detail below.

Figure 4A:
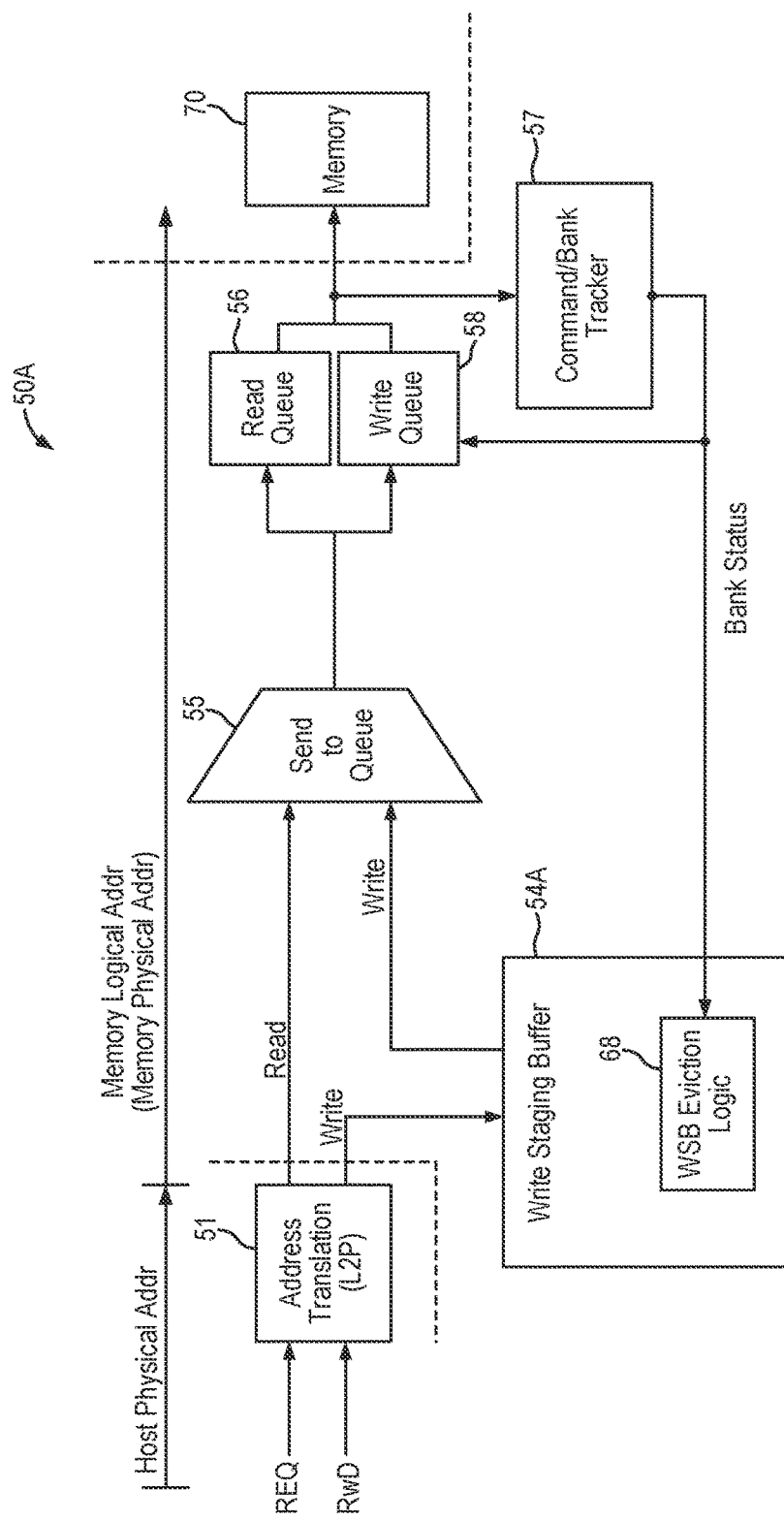
FIG. 4(a) is a representative block diagram of a memory channel controller illustrating a first bank status tracking scheme in embodiments of the present invention.

In embodiments of the present invention, the write staging buffer uses various schemes to monitor the status of the memory banks to determine if memory banks associated with the pending write requests are busy or idle. FIG. 4(a) is a representative block diagram of a memory channel controller illustrating a first bank status tracking scheme in embodiments of the present invention. It is instructive to note that FIG. 4(a) is provided to illustrates methods for bank status tracking by the write staging buffer. Other elements of the channel controller may be omitted in FIG. 4(a) to simplify the discussion.

Referring to FIG. 4(a), a memory controller incorporating a channel controller 50A receives incoming read and write requests from a host processor. The incoming read requests (REQ) and write requests (RwD) are encoded with the host physical address and are first provided to an address translation circuit 51 to convert the host physical address to a memory logical address. The decoded read requests and write requests are then provided to the channel controller 50A. It is instructive to note that the address translation may be part of the channel controller or may be part of the memory controller but outside of the channel controller. For example, the memory controller may include an address translation circuit to perform address translation on incoming read/write requests for one or more channel controllers and then forward the decoded read/write requests to the respective channel controllers.

In the present description, a memory physical address refers to the memory address used to access or address the storage transistors in the memory device. For instance, the memory physical address may include a memory channel address, a memory bank address, a word line address and a memory page address to access one page of storage transistors. In some examples, a page includes 512 storage transistors. In the case of a memory module including multiple memory dies, the memory physical address may include a memory die address. In the present description, the memory logical address is related to the memory physical address. In some cases, the memory logical address is the memory physical address. In other cases, address mapping, such as wear leveling, redundancy, or other types of address mapping, may be applied. In that case, the memory logical address refers to the memory address before applicable address mapping is applied and the memory physical address refers to the memory address after applicable address mapping. The memory physical address is the memory address provided to the memory device. The memory physical address selects a memory channel out of the N memory channels and, in the case of a multi-die configuration, selects a memory die out of the K number of memory dies in the selected memory channel. The memory physical address further selects a memory bank (tile) within the selected memory die of the selected memory channel. In the selected memory bank, the memory physical address selects a word line, which activates P number of memory pages. The memory physical address finally selects one memory page out of the P memory pages associated with the selected word line. As described above, each memory page includes Q number of data bits, such as 512 bits.

In the present embodiment, no additional address mapping (e.g. wear leveling, redundancy mapping) is applied and the memory logical address is the same as the memory physical address. The channel controller 50A receives the incoming read requests and the incoming write requests with the memory address decoded to the memory physical address. The channel controller stores the pending read requests in an ingress buffer (not shown) which provides the pending read requests to the read queue 56. The channel controller 50A stores the write requests in the write staging buffer 54A as pending write requests and the write staging buffer 54A provides the pending write requests to the write queue 58 based on the write request staging scheme described herein. In practice, the channel controller 50A includes an arbitration circuit 55 to select a pending read request or an evicted pending write request to pass to the respective read queue 56 and write queue 58. The read queue 56 and the write queue 58 stores the respective active read requests and active write requests. The read queue 56 and the write queue 58 arbitrate to send commands to the memory device 70.

In embodiments of the present disclosure, the channel controller 50A includes a command and bank tracker 57 which monitors the commands being sent to the memory device 70 and the memory banks at which commands have been sent. In other words, the command and bank tracker 57 monitors the status of the memory banks and in particular, the command and bank tracker 57 provide bank status of memory banks that are currently executing a memory operation and are otherwise considered busy. The read queue 56 and the write queue 58 use the bank status information to determine which active request to send to the memory device 70. In particular, the read queue 56 and the write queue 58 bid for access to send commands to the memory device 70 when the memory banks associated with the active requests stored therein are not busy (i.e., not current executing a memory operation), as indicated by the command and bank tracker 57.

Meanwhile, the bank status information stored in the command bank tracer 57 is provided to the write staging buffer 54A. In embodiments of the present invention, the write staging buffer 54A includes a WSB eviction logic circuit 68 to implement the write request staging scheme to determine which pending write requests stored in the write staging buffer 54A can be forwarded to the write queue 58. In the present embodiment, the WSB eviction logic circuit 68 uses the bank status information provided by the command and bank tracker 57 to determine whether the memory banks associated with the pending write requests are busy or idle.

Figure 4B:
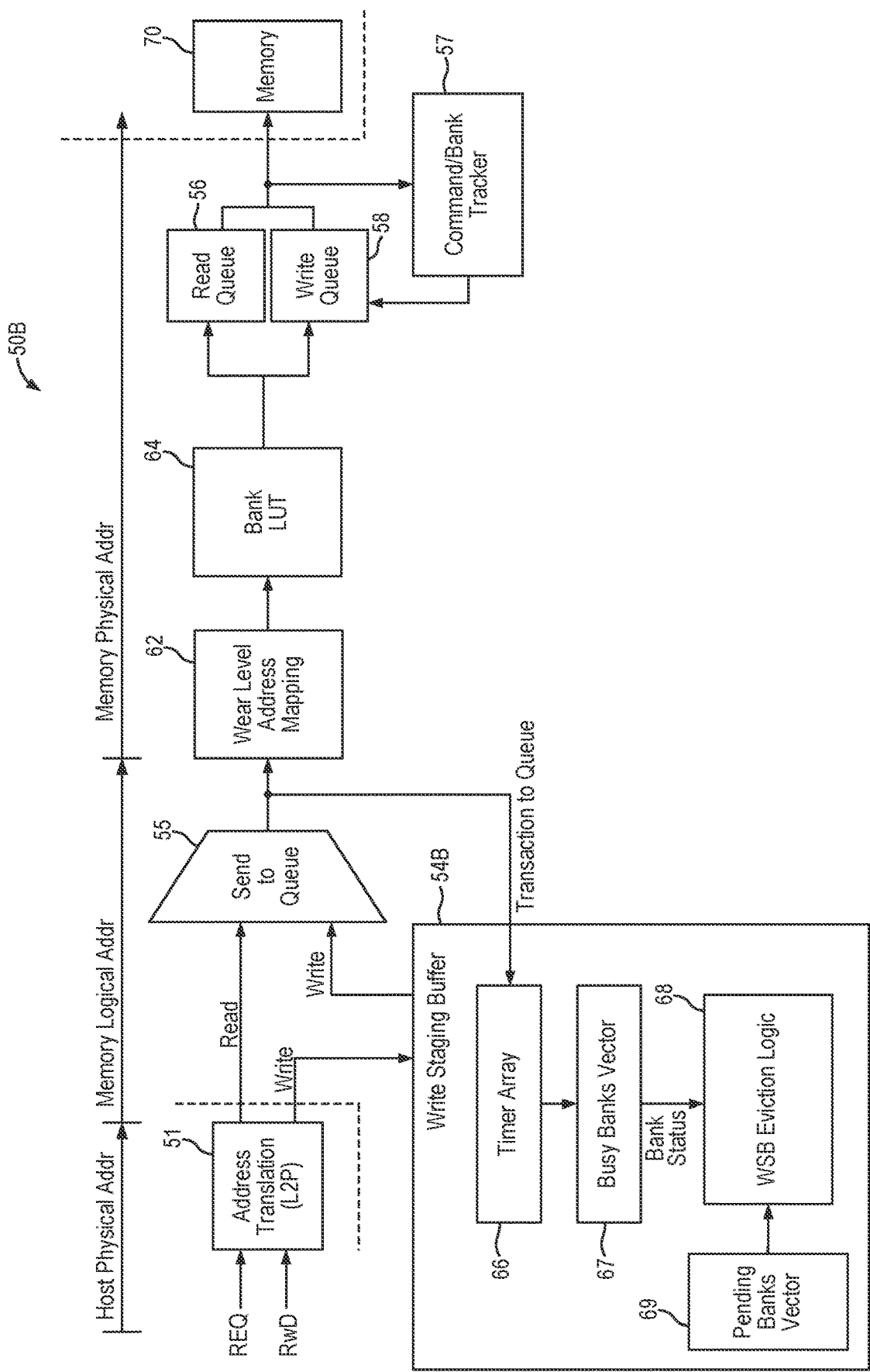
FIG. 4(b) is a representative block diagram of a memory channel controller illustrating a second bank status tracking scheme in embodiments of the present invention.

In other embodiments, the memory channel controller performs address mapping, such as for wear leveling or redundancy mapping. In that case, the write staging buffer implements alternate bank status tracking schemes to monitor the bank status as the memory physical address is no longer the same as the memory logical address. FIG. 4(b) is a representative block diagram of a memory channel controller illustrating a second bank status tracking scheme in embodiments of the present invention. Referring to FIG. 4(b), a memory controller incorporating a channel controller 50B receives incoming read and write requests from a host processor. The incoming read requests (REQ) and write requests (RwD) are encoded with the host physical address and are first provided to an address translation circuit 51 to convert the host physical address to a memory logical address. The decoded read requests and write requests are then provided to the channel controller 50B.

The channel controller 50B receives the incoming read requests and the incoming write requests with the memory address decoded to the memory logical address. The channel controller 50B stores the pending read requests in an ingress buffer (not shown) which is configured to provide the pending read requests to the read queue 56. The channel controller 50B stores the write requests in the write staging buffer 54B as pending write requests and the write staging buffer 54B provides the pending write requests to the write queue 58 based on the write request staging scheme described herein. In some embodiments, the channel controller 50B includes an arbitration circuit 55 to select a pending read request or an evicted pending write request to pass to the respective read queue 56 and write queue 58. In the present embodiment, after a pending request (read or write) is selected, the channel controller 50B performs additional address mapping to convert the memory logical address to the memory physical address.

In the present embodiment, the channel controller 50B performs wear leveling address mapping 62. For instance, wear leveling is applied to map the memory logical addresses to different memory physical addresses so that the same memory physical addresses are not being used all of the time. By distributing the use of the storage transistors over the entire memory device, the memory device can realize a high endurance level. In the present embodiment, the channel controller 50B further performs bank address mapping through the use of a bank lookup table (LUT) 64. Bank address mapping is performed to replace one memory bank with another memory bank, such as to replace a defective memory bank with a spare memory bank or to retire a memory bank with a high level of wear out with a spare memory bank. For instance, the memory device 70 may be provided with spare memory banks and when one or more memory banks are identified to be defective, such as due to manufacturing defects, the defective memory banks may be replaced by the spare memory banks through bank address mapping using the bank LUT 64. Alternatively, spare memory banks may be provided on an additional memory device electrically connected to the controller. In the present embodiments, the channel controller 50B performs both wear level address mapping and bank address mapping. This is illustrative only and not intended to be limiting. In other embodiments, the memory channel controller may perform one or both types of memory address mapping, or other types of memory address mapping, depending on the characteristics or requirements of the memory device 70.

After the address mapping by the wear level address mapping 62 and the bank lookup table 64, the read or write requests are now encoded with the memory physical address. The read or write requests are stored in the read queue 56 and the write queue 58 as active requests. The read queue 56 and the write queue 58 arbitrate to send commands to the memory device 70. In the present embodiment, the channel controller 50B includes a command and bank tracker 57 which monitors the commands being sent to the memory device 70 and the memory banks at which commands have been sent. The read queue 56 and the write queue 58 uses the bank status information to determine which active request to send to the memory device 70. In particular, the read queue 56 and the write queue 58 bid for access to send commands to the memory device 70 when the memory banks associated with the active requests stored therein are not busy (i.e., not current executing a memory operation), as indicated by the command and bank tracker 57.

However, the write staging buffer 54B cannot make use of the bank status information from the command and bank tracker 57 because the bank addresses are in different memory address space. In particular, the write staging buffer 54B stores pending read/write requests using the memory logical address space while the read/write queues 56, 58 store active read/write requests using the memory physical address space. In some cases, reverse address mapping can be performed to provide the bank status from the command and bank tracker 57 to the write staging buffer 54B.

In embodiments of the present invention, the write staging buffer 54b implements a bank status tracking scheme that operates only on the memory logical address space, therefore, not requiring any reverse address mapping from the memory physical address. More specifically, the write staging buffer 54B implements the second bank status tracking scheme using a time based heuristic. In some embodiments, the write staging buffer 54B monitors the transactions that are being sent to the read queue and the write queue before the additional address mapping. For instance, the write staging buffer 54B monitors the read/write transactions being sent to the read/write queue at the output of the arbitration circuit 55. The write staging buffer 54B includes a timer array 66 to monitor the status of the memory banks where pending read/write requests have been sent to the read/write queues. In some embodiments, in response to a pending read/write request designated for a given memory bank in the memory logical address having been sent to the read/write queue, the timer array 66 marks the memory bank as busy for a given time duration. In one example, the timer array 66 may set the time duration to be the time required for the memory to complete the given memory operation (e.g. read or write operation). In some embodiments, the time duration a memory bank is marked as busy is the same for any memory operation. In other embodiments, the time duration a memory bank is marked as busy is a function of the memory operation being performed. In some embodiments, the time duration for a memory bank to be marked busy for a read operation is different from the time duration for a memory bank to be marked busy for a write operation. For example, the time duration the memory bank is marked busy for a read operation may be 100 ns and the time duration the memory bank is marked busy for a write operation may be 1 μs. In other words, the write staging buffer 54B uses time based heuristic to estimate the time it will take to complete the read or write operation for the transactions being sent to the read/write queue and will assume that after the estimated time has elapsed, the read/write operation is completed and the memory bank associated therewith will be idle.

In the present embodiment, the write staging buffer 54B may maintain a busy banks vector 67 used by the timer array 66 to indicate memory banks that are marked busy. When the time duration has expired for a given busy memory bank, the timer array 66 may remove the busy indication for the memory bank in the busy banks vector 67 or may remove the previously busy memory bank from the busy banks vector 67. The write staging buffer includes a WSB eviction logic circuit 68 to implement the write request staging scheme to determine which pending write requests stored in the write staging buffer 54B can be forwarded to the write queue 58. In the present embodiment, the WSB eviction logic circuit 68 obtains the bank status of the memory banks marked busy from the busy banks vector 67. In some embodiments, the write staging buffer 54B maintains a pending banks vector 69 to indicate memory banks with pending write requests. The WSB eviction logic circuit 68 obtains from the pending banks vector 69 the pending memory banks. With the bank status information and the pending banks information, the WSB eviction logic circuit 68 determines, according to the set of eviction rules, which pending write request should be evicted or transferred to the write queue 58. For instance, the WSB eviction logic circuit 68 operates to transfer pending write requests to the write queue when the memory banks associated therewith are not busy, that is, the memory banks exist in the pending banks vector 69 but are not marked as busy in the busy banks vector 67. The WSB eviction logic circuit 68 keeps pending write requests in the write staging buffer 54B in response to the memory banks of the pending write requests being marked as busy in the busy banks vector 67. Lastly, the WSB eviction logic circuit 68 may force eviction of pending write requests under certain operating conditions, regardless of whether the memory banks associated therewith are marked as busy.

Figure 5:
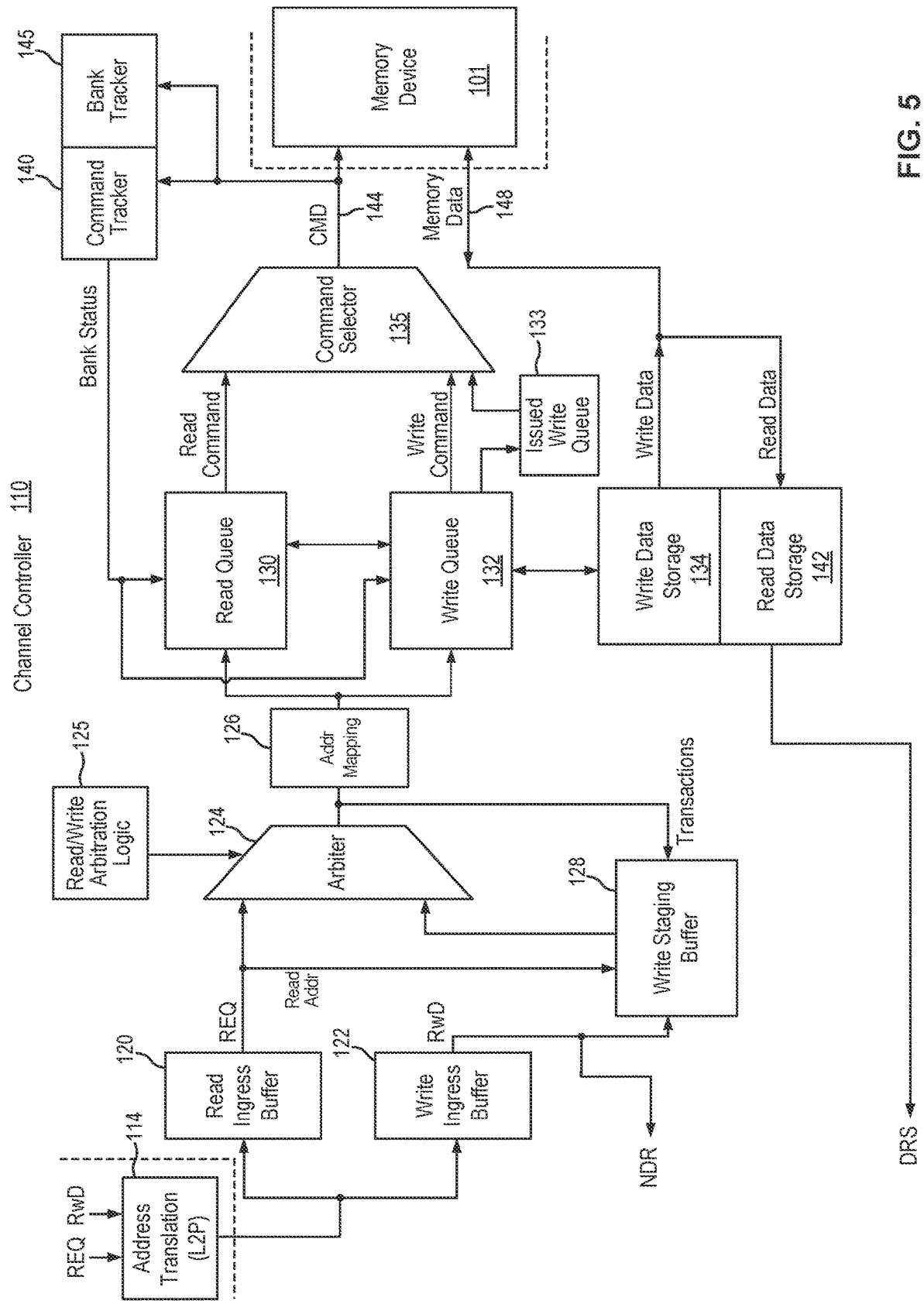
FIG. 5 is a schematic diagram of a memory channel controller which can be implemented in a memory controller in embodiments of the present invention.

FIG. 5 is a schematic diagram of a memory channel controller which can be implemented in a memory controller in embodiments of the present invention. Referring to FIG. 5, a memory controller incorporating a channel controller 110 receives incoming read/write requests on a host memory interface and the requests are provided to an address translation circuit 114, which may be provided in the memory controller outside of the channel controller. The incoming read requests (REQ) and write requests (RwD) are encoded with the host physical address. The address translation circuit 114 decodes the address in each request to convert the host physical address to a memory logical address. The memory logical address, which is related to the memory physical address used to address and access the memory device 101, may include a memory channel address, a memory bank address, a word line address and a memory page address to access one page of storage transistors in the memory device 101. In the case the memory device 101 includes multiple memory dies, the memory logical address may include a memory die address. In embodiments where the memory device 101 is partitioned into multiple memory channels, the memory controller includes multiple instances of the channel controller 110 and the memory channel address selects one channel controller out of the multiple channel controllers. Based on the memory channel address indicated in the decoded memory logical address, the read/write requests are provided to the respective channel controller 110. As a result of the address translation, each channel controller 110 receives incoming requests for read or write operation that are designated for its memory channel.

It is instructive to note that the operation of the channel controller 110 is based on one or more clock signals. Typically, the channel controller 110 operates based on a controller clock signal at a given clock frequency. Signals transmitted into and out of the channel controller may cross over different clock domains (that is, different clock frequencies). In that case, buffers or clock crossing FIFO circuits may be used for signals crossing over two different clock frequencies. In the present description, clock signals and related clock crossing circuits are not shown in FIG. 5 to simplify the discussion. It is understood that the operation of the channel controller is synchronized to the controller clock signal. For instance, the channel controller 110 sends commands to the memory device 101 at each clock cycle of the controller clock signal. In one example, the controller clock signal has a frequency of 500 MHz and the channel controller sends a commands to the memory device every one clock cycle or every two clock cycles, that is, every 2 ns or 4 ns, a command is sent to the memory device where there is a command available.

Referring to FIG. 5, the channel controller 110 receives decoded read or write requests from the address translation circuit 114 and stores the requests into separate ingress buffers. In particular, incoming read requests are stored in a read ingress buffer 120 as pending read requests and incoming write requests are stored in a write ingress buffer 122. The incoming write requests are then provided to and stored in a write staging buffer 128 as pending write requests. An ingress channel arbiter 124 regulates the flow of the pending read and write requests to a read queue 130 and a write queue 132, based on one or more predetermined priority rules provided by the read/write arbitration logic circuit 125. In particular, the ingress channel arbiter 124 arbitrates the pending read requests from the read ingress buffer 120 and the evicted pending write requests from the write staging buffer 128 to select requests to send to the read and write queues 130 and 132, based on the predetermined priority rules. For example, the ingress channel arbiter 124 may give priority to read requests unless the write staging buffer is almost full for one or more memory banks. The ingress channel arbiter 124 may further consider attributes such as the age of a request or the memory bank status in the priority determinations. In another example, the ingress channel arbiter 124 forwards read requests to the read queue or forwards write requests to the write queue in a manner to avoid excessive bank conflicts.

In the present embodiment, the pending read requests and write requests in the read ingress buffer 120 and the write staging buffer 128 are in the memory logical address space. The channel controller 110 performs additional address mapping, such as for wear leveling or for redundancy replacement, as described above. The channel controller 110 includes an address mapping circuit 126 to convert requests encoded with a memory logical address to requests encoded with a memory physical address. In one embodiment, the address mapping circuit 126 performs wear leveling memory address mapping. In another embodiment, the address mapping circuit 126 further performs redundancy bank replacement, such as using a bank look-up table. After the address mapping by address mapping circuit 126, the read and write requests are encoded with the memory physical addresses. Accordingly, the active read requests and active write requests in the read queue 130 and the write queue 132, respectively, are encoded in the memory physical address space.

The read queue 130 and write queue 132 store active read and write requests and generate commands for the memory device 101 based on the requests. The read queue 130 and the write queue 132 generate commands which bid for access to the memory device 101 through a command selector 135, sometimes referred to as a global scheduler. The command selector 135 selects the commands to be sent to the associated memory channel of the memory device 101 to perform the memory operation at the destination memory address associated with the selected request. The command selected by the command selector 135 is sometimes referred to as a "winning command."

In embodiments of the present disclosure, the channel controller 110 of FIG. 5 is adapted for a memory device where the write latency is much longer than the read latency. A salient feature of the channel controller of the present invention is that the channel controller is configured to mask what may be a long write latency from the host. In some embodiments, the channel controller 110 stores the incoming write requests and write data in the write staging buffer 128 and returns the write completion responses to the host prior to the write operation actually being performed at the memory device, that is, prior to the write data being stored onto the memory device. Meanwhile, the channel controller 110 manages the write requests and performs the write operation to the memory device in the background of the host operation so that any extended write latency at the memory device is hidden from the host system and the host system can operate as if there is only a nominal write latency at the memory device.

In the present embodiment, in the channel controller 110, each write request stored in the write ingress buffer 122 is first transferred to the write staging buffer 128 and the pending write request entries in the write staging buffer 128 are then provided to the ingress channel arbiter 124 for arbitration with the pending read requests from the read ingress buffer 120. In embodiments of the present invention, the write staging buffer 128 is used to prevent too many write requests to the same memory bank of the memory channel from being sent to the write queue 132 which may fill up the write queue and causing backpressure to the write ingress buffer 122. In some embodiments, the write staging buffer 128 is sized to store a large number of pending write requests, sufficient to handle the write latency of the memory device being masked from the host. In the present embodiment, eviction of a write request from the write ingress buffer 122 to the write staging buffer 128 signals a write completion response to the host. That is, whenever a write request is evicted or removed from the write ingress buffer 122 and transferred to the write staging buffer 128, a write completion response for that write request is sent out to the host. From the host's perspective, that particular write request is completed while the channel controller 110 maintains and handles the write request to be completed at the memory device 101. In some examples, the write completion response (e.g. an NDR under the CXL protocol) for the respective memory channel n is provided to a channel arbiter (not shown), which receives the write completion responses from all of the memory channels. The channel arbiter selects, based on predetermined arbitration rules, the write completion response from the memory channels to be provided to the host, through the host interface.

In embodiments of the present disclosure, the read ingress buffer 120 forwards the memory address of the pending read requests ("read address") to the write staging buffer 128. The write staging buffer 128 determines if the read request is for the same memory logical address as a pending write request in the write staging buffer 128. In the event the write staging buffer 128 determines a read request has a memory address that matches the destination memory address of a pending write request in the write staging buffer, the write staging buffer 128, implementing the write request staging scheme of the present invention, may operate based on the forth eviction rule described above and force eviction of the matching write request to the write queue 132 (through the ingress channel arbiter 124). The read request is then also transferred to the read queue 130 (through the ingress channel arbiter 124). At the read/write queues, the channel controller 110 operates to maintain the order of the read requests and write requests. The channel controller 100 determines a read request in the read queue is matched with an earlier received write request, that is, both requests are designated for the same memory physical address. Accordingly, the read request can take the write data stored in the write data storage 134 to satisfy the read request. In this manner, the order of the write and read requests is preserved and the correct data is provided to a read request that follows a write request at the same memory address. In the present embodiments, any read request that arrives after a write request at the same destination memory address will cause a force eviction of the write request from the write staging buffer 128 and retrieval of the read data from the write queue. The channel controller 110 does not have to wait for the write operation to complete to retrieve the read data from the memory device 101.

In some cases, the write staging buffer 128 may receive from the write ingress buffer 122 a new write request that is designated to the same memory address as an existing pending write request already in the write staging buffer. In that case, the write staging buffer 128 will write over the old write data of the existing write request using the new write data of the new write request. That is, the new write request overwrites the write data of the existing pending write request in the write staging buffer 128.

In the present embodiment, the read queue 130 is a data structure that stores the active read requests for the associated memory channel. The read queue 130 stores the active read requests with the destination memory address, such as the memory bank address and the memory page address for each read request. The read queue 130 further stores for each read request other attributes associated with the read request, such as the status of the memory bank indicated by the destination memory address and the command being processed at the memory bank, if any. The memory bank status ("bank status") is used to indicate whether the read request is eligible to be sent to the memory device. In the present embodiment, each entry in the read queue 130 can request to send an Activate command or a Read command. The Activate command instructs the memory device 101 to start sensing the stored data in the designation memory page of the designation memory bank using the sense amplifier circuits and to store the sensed data in a data latch coupled to the sense amplifier circuit. The Read command outputs the sensed data stored in the data latch to the channel controller 110. For instance, the read data is read out of the memory device 100 and stored in a read data storage 142.

In the present embodiment, the write queue 132 is a data structure that stores the active write requests for the associated memory channel. The write queue 132 stores the active write requests with the destination memory address, such as the memory bank address and the memory page address for each write request. In the present embodiment, the write data for each write request is stored in the write data storage 134 in communication with the write queue 132. The write queue 132 further stores for each write request other attributes associated with the write request, such as the status of the memory bank indicated by the destination memory address and the command being processed at the memory bank, if any. The memory bank status ("bank status") is used to indicate whether the write request is eligible to be sent to the memory device. In the present embodiment, each entry in the write queue 131 can request to send a write command. The write command is sent to the memory device with the accompanying write data stored in the write data storage 134 to instruct the memory device to write the data into the designation memory page of the designation memory bank. In some embodiments, the write data is first stored into a data latch in the memory device and a bit line bias control circuit drives the write data into the storage transistors.

In the present embodiment, an active read or write request is eligible for bidding access to the memory device 101 when the memory bank it is destined for does not currently have a memory operation being performed. For example, a read or write request is eligible when the memory bank it is destined for is not currently being read from, or written to. Eligible read or write requests bid for access to the memory device 101 through the command selector 135. The command selector 135 arbitrates the commands received from eligible read or write requests to determine the command ("the winning command") to send to the memory device 101 at each clock cycle (or each x number of clock cycles).

In embodiments of the present disclosure, the command selector 135 selects the commands to send to the memory device 101 based on predefined priority rules. In the present embodiment, the command selector 135 transmits Activate, Read and Write commands to the respective memory channel of the memory device over the command bus 144. Synchronized to a write command being provided on the command bus 144, the associated write data is provided on a data bus 148 from the write data storage 134. In response to the Read command, the memory device 101 provides the read data on the data bus 148 which is then stored in the read data storage 142. The read data is provided as the read data response for the memory channel. In the present example, the read data response (e.g. DRS for CXL protocol) for the respective memory channel n is provided to a channel arbiter (not shown), which receives the read data response from all of the memory channels. The channel arbiter selects, based on predetermined arbitration rules, the read data response from the memory channels to be provided to the host, through the host interface.

In embodiments of the present disclosure, the channel controller 110 is configured to operate in a manner to maximize the performance of the memory device. For example, in one embodiment, the channel controller is configured to operate in a greedy mode wherein the channel controller always tries to send commands to the memory device for execution, as long as there are requests pending. Accordingly, the read queue 130 and the write queue 132 will always send eligible commands to the command selector 135 to bid for access to the memory device. Meanwhile, the command selector 135 operates based on predefined priority rules to select the winning command to send to the memory device each clock cycle (or each x number of clock cycles). In one example, the command selector 135 may be configured in a Read Priority mode where commands for write operations are sent in empty clock cycles between commands for read operations. In another example, the command selector 135 may be configured in a Write Priority mode where commands for read operations are sent in empty clock cycles between commands for write operations. In some embodiments, the predefined priority rules may include fixed priority rules or dynamic priority rules.

In operation, the read queue 130 and the write queue 132 store active read and write requests for the memory device, each read/write request being associated with a destination memory page in a destination memory bank of a destination memory die of the memory channel. The read queue 130 and write queue 132 determine which of the active requests stored therein are eligible to be executed at the memory device. The read queue 130 and write queue 132 always try to send all eligible commands to the command selector 135. The command selector 135 arbitrates the commands using the predefined priority rules and selects a winning command at each clock cycle (or each x number of clock cycles). The winning command will then be sent to the memory device 101 over the respective memory command bus 144 (with the write data on the data bus 148). To keep track of the memory operation being performed at the memory device, the winning command is provided to a command tracker 140 which operates to track the progress of each command sent to the memory device. The winning command is also provided to a bank tracker 145 which tracks the status of each memory bank in the memory channel. The read queue 130 and the write queue 132 use the information in the bank tracker 145 and the command tracker 140 to determine the status of each memory bank to which a request is pending and, based on the bank status, determine commands that are eligible for bidding for access at the command selector 135.

In some embodiments, the bank tracker 145 is a data structure and stores banks status data for each memory bank in the memory channel where the bank status indicates whether a given memory bank is idle (and thus eligible to receive commands) or is busy (thus not eligible to receive commands). The bank tracker may further store data indicating the memory operation being performed at a busy memory bank. The read queue 130 and the write queue 132 obtain the status of each memory bank associated with respective active requests from the bank tracker 145.

In some embodiments, the command tracker 140 tracks each command sent and being executed at each memory bank of the memory device based on clock timing. In one embodiment, each command being executed at the memory device 101 is assigned a predetermined command execution time. The command tracker 140 tracks commands issued for execution at the memory device and indicates a given command is completed at the expiration of the predetermined command execution time assigned to that command. In some examples, the progress of each command being executed is tracked using clock cycles. In one example, the commands sent to the memory device 101 share the same time base, for example, a command is sent every 4 ns. In some embodiments, the command tracker 140 is implemented as a shift register. In one example, a winning command is allocated at the head of the shift register and is shifted every clock cycle so as to keep track of the progress of the command being executed at the memory device. In some embodiments, configurable tap points are provided in the shift register to indicate relevant timing restrictions. A command progressing through the shift register is compared with each tap point. A match at a tap point indicates that the time or clock cycles from the command being issued to the given tap point has passed. In this manner, the command tracker keeps track of the progress of each command issued to the memory device. A command that has progressed past the tap point associated with the assigned command execution time will be indicated as a completed command and the associated memory bank indicated as free.

As thus configured, the read queue 130 and the write queue 132 determine the bank status and the memory operation in progress at each memory bank in which a request is pending. The bank status and memory operation progress information allows the read queue and the write queue to determine whether an active request in the queues is associated with a memory bank that is busy or a memory bank that is idle or free. For active requests associated with inactive memory banks, the read queue and the write queue issue eligible commands to bid for access. The command selector 135 select the winning command among the eligible commands in each clock cycle (or each x clock cycles) to send to the memory device 101. The command tracker 140 and the bank tracker 145 update their respective status in response to the winning command at each clock cycle (or each x clock cycles). In this manner, the winning command is identified to the read queue 130 and the write queue 132 and the bank status associated with the memory bank of the winning command is updated to busy. Any active request to the same memory bank will now become ineligible for bidding.

In embodiments of the present disclosure, an active read/write request in the respective read/write queue issues a command to bid for access to the memory device and in the case the command is selected and sent to the memory device, the issued request remains in the respective read/write queue until the command tracker indicates the command has been completed at the memory device. For example, the command tracker 140 tracks the progress of each issued command to the memory device 101 and indicates whether each command has been completed or is still in progress. In some embodiments, the channel controller 110 includes an issued write queue (IWQ) 133. The write queue 132 allocates an active write request entry to the issued write queue 133 when the active write request is the winning command at the command selector 135. In particular, the write queue 132 sends the Write command with the write data to the memory device 101 in response to an active write request being selected by the command selector 135. The write queue 132 then transfers the write request to the issued write queue 133. The issued write queue 133 handles the remaining write operation flow, such as sending a Commit command to instruct the memory device 101 to initiate the bias voltage sequence to write the previously sent write data into the storage transistors at the destination memory address. The issued write queue 133 stores the issued write requests until completion. It is instructive to note that the use of the issued write queue 133 is optional and may be omitted in other embodiments. In other embodiments, issued write requests may be stored in the write queue 132 itself until completion.

In the present description, the structure and operation of the channel controller are described to illustrate the process flow from receiving incoming requests to generating commands for the memory device. It is understood that the channel controller may include other circuit elements not shown or described to support the memory operation. For example, the channel controller may implement error detection and correction and the channel controller may include an ECC encoder to perform error correction encoding and an ECC decoder to detect and correct for bit errors, thereby preventing data loss. ECC circuits and other support circuits that may be included in the channel controller are omitted in FIG. 5 to simplify the discussion.

In embodiments of the present disclosure, the write staging buffer 128 operates cooperatively with the write queue 132 to maximize the write bandwidth of the memory system. In particular, the write staging buffer 128 stores pending write requests and only forward write requests to the write queue in a manner to avoid bank conflicts at the write queue. That is, the write staging buffer 128 evicts a pending write request to the ingress channel arbiter 124 to bid for access to the write queue 132 only when the memory bank associated with the pending write request is not already associated with another read or write request in the read queue or write queue, respectively. That is, the memory bank of the pending write request does not conflict with any memory banks in the active read or write requests. For example, if there is a write request in the write queue for a given memory bank, the write staging buffer 128 does not forward additional write requests to the same memory bank to the write queue but will forward write requests destined for other memory banks that are idle to the write queue instead. In this manner, the write staging buffer 128 avoids sending excessive number of write requests to the same memory bank to the write queue 132 which may cause the write queue to fill up in the case the memory device has a long write latency.

In the embodiment shown in FIG. 5, the channel controller 110 uses address mapping circuit 126 to convert the memory logical address to the memory physical address.

Therefore, the write staging buffer 128 monitors the transactions being sent to the read queue/write queue at the output of the ingress channel arbiter 124 and uses the monitored transaction information to mark memory banks that has become busy. The write staging buffer 128 implements the write request staging scheme described herein and applies a set of eviction rules to determine the priority of evicting or transferring pending write requests to the write queue 132 (through the ingress channel arbiter). As described above, the write request staging scheme may include a first eviction rule to evict each pending write request to the write queue where the memory banks of the pending write requests are idle. The write request staging scheme may include a second eviction rule to force evict a pending write request that has aged past a maximum time duration. The write request staging scheme may include a third eviction rule to force evict a pending write request to a given memory bank when either the write staging buffer is nearly full or the storage area in the write staging buffer designated for the given memory bank is nearly full. Lastly, the write request staging scheme may include a third eviction rule to force evict a pending write request when an incoming read request has a destination memory address matching a destination memory address of a write request in the write staging buffer.

Figure 6:
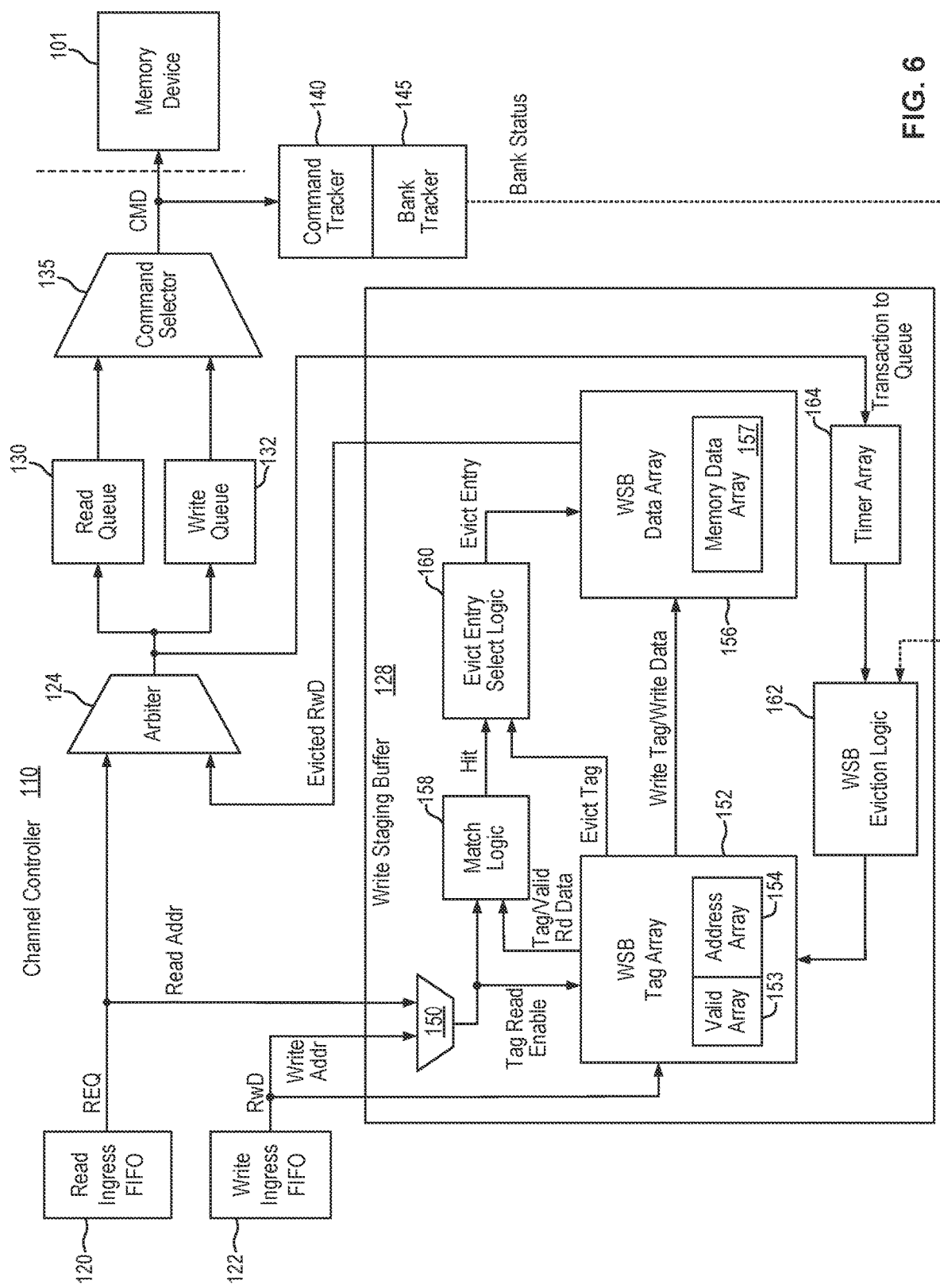
FIG. 6 illustrates a detailed construction of the write staging buffer in the channel controller of FIG. 5 in embodiments of the present invention.
Figure 7A:
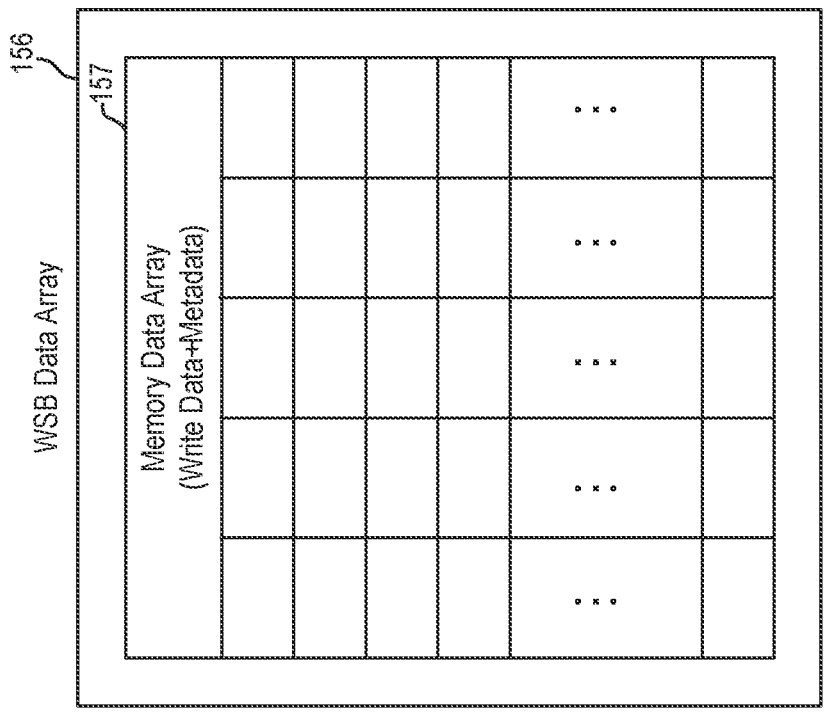
FIGS. 7(a) and 7(b) illustrate the structure of the WSB tag array and the WSB data array in some embodiments.
Figure 7B:
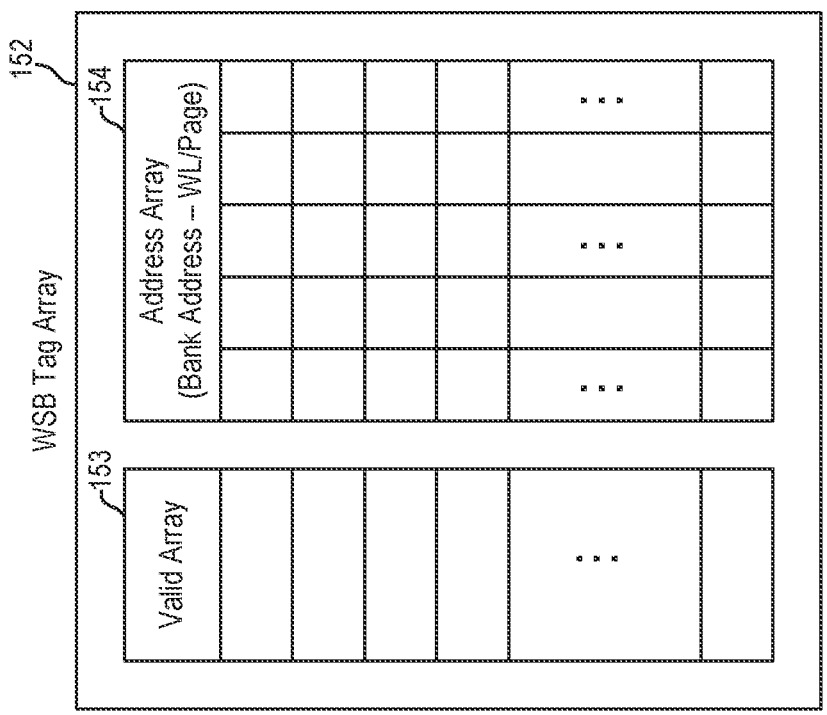

FIG. 6 illustrates a detailed construction of the write staging buffer in the channel controller of FIG. 5 in embodiments of the present invention Like elements in FIGS. 5 and 6 are given like reference numerals to simplify the discussion. Referring to FIG. 6, the write staging buffer 128 includes a WSB tag array 152 and a WSB data array 156. The WSB tag array 152 includes a valid array 153 and an address array 154. The WSB data array 156 includes a memory data array 157. FIGS. 7(a) and 7(b) illustrate the structure of the WSB tag array 152 and the WSB data array 156 in some embodiments. Referring to FIG. 7(a), the WSB tag array 152 includes the valid array 153 for storing information that indicates the valid status of each entry in the address array 154. In some examples, the valid array 153 has 512 entries and each entry has 8 data bits. The WSB tag array 152 further includes the address array 154 for storing the memory address of the pending write requests. In some examples, the address array 154 has 512 entries and each entry has 68 bits. Each entry in the address array corresponds to one memory bank. Each entry further includes 8 ways for storing 8 memory addresses per memory bank. Referring to FIG. 7(b), the WSB data array 156 includes a memory data array 157 for storing write data of the pending write requests and also associated metadata. In some examples, the memory data array 157 has 512 entries and each entry has 4320 bits. Each entry in the address array corresponds to one memory bank. Each entry further includes 8 ways for storing 8 sets of write data and metadata corresponding to the 8 memory addresses stored in the address array 154 of the WSB tag array 152. For instance, each way has 540 bits for storing 512 bits of write data and remaining bits of metadata. In this example configuration, the write staging buffer stores pending write requests for 512 memory banks and 8 write requests for each memory banks.

Returning to FIG. 6, the write staging buffer 128 receives incoming write requests (RwD) where the memory logical addresses of the write requests are stored in the WSB tag array 152 and the write data and other metadata information (such as a write tag) are stored in the WSB data array 156. Entries in the valid array 153 are updated when incoming write requests are stored in the WSB tag array 152. The write staging buffer 128 monitors the status of the memory banks to determine when a pending write request stored therein can be forwarded to the write queue. In the present embodiment, it is assumed that the channel controller applies address mapping so that the read/write requests are in the memory logical address space before the ingress channel arbiter 124 but in the memory physical space after. In that case, the write staging buffer 128 monitors the bank status by tapping the transactions that are being sent out from the ingress channel arbiter 124. The write staging buffer 128 includes a timer array 164 to monitor the status of the memory banks when pending read/write requests have been sent to the read/write queues. In response to a read or write request being sent out from the ingress channel arbiter 124, the timer array 164 marks a memory bank as busy for a predetermined time duration. The time duration may be a function of the type of request being sent. For example, the time array may mark a memory bank as busy for 100 ns for a read request and lids for a write request. The timer array 164 provides the bank status to the WSB eviction logic 162. In other embodiments, the write staging buffer may include a busy banks vector and a pending banks vector, configured and described with reference to FIG. 4(b). In other embodiments, the channel controller 110 may not perform further address mapping and that the memory logical address is the same as the memory physical address. In that case, the write staging buffer 128 can obtain the bank status information directly from the bank tracker 145 (dotted line in FIG. 6) and the timer array 164 may be omitted.

As described above, the WSB eviction logic circuit 162 obtains the bank status of the memory banks marked busy and determines, according to the set of eviction rules, which pending write request should be evicted or transferred to the write queue 132. Several eviction rules have been described above. For instance, the WSB eviction logic circuit 162 operates to transfer pending write requests to the write queue when the memory banks associated therewith is not busy. Alternately, the WSB eviction logic circuit 162 may force eviction of pending write requests under certain operating conditions, regardless of whether the memory banks associated therewith are marked as busy, as described above. The WSB eviction logic 162 causes an evict tag to be generated for the pending write request that is to be forwarded to the write queue. The evict tag is provided to an evict entry select logic circuit 160. The evict entry select logic circuit 160 receives the evict tag and selects the corresponding evict entry from the WSB data array 156 based on the evict tag. The selected pending write request is evicted and provided to ingress channel arbiter 124 to bid for access to the write queue 132.

The write staging buffer 128 receives the memory address of the read requests ("read address") and the memory address of the write requests ("write address") which are coupled to a selector 150. The selector 150 selects a memory address for matching with the memory addresses of the pending write requests in the WSB tag array 152. In the present embodiment, a tag read enable signal is asserted to obtain the memory addresses of the pending write requests. In particular, WSB tag array 152 provides the memory addresses of the pending write requests to a match logic circuit 158 to be compared with the memory address of the incoming read/write requests (from selector 150). When a match is identified (also referred to as a "hit"), the evict entry select logic circuit 160 receives an evict tag identifying the entry with the hit and is instructed by the match logic 158 to select an evict entry from the WSB data array 156 based on the evict tag. The selected pending write request is evicted and provided to ingress channel arbiter 124 to bid for access to the write queue 132. In this manner, the match logic circuit 158 in the write staging buffer 128 implements the force eviction of pending write requests in response to a read request hitting a pending write request. Another case where force eviction is implemented is when an incoming partial write request is matched to a pending write request. The partial write force eviction will be described in more detail below.

As thus configured, the write staging buffer in the channel controller operates cooperatively with the write queue to enable the channel controller operates at the maximum write bandwidth, even though the write latency of the memory device coupled thereto may be long. The write queue is sized to support the maximum bandwidth of the memory system. In some examples, the write queue is sized large enough to accommodate the write latency of the memory device. For example, when the memory device has a write latency of 1 μs and the channel controller sends commands to the memory device every 4 ns, the write queue would be sized to store 250 active write requests. In this manner, the write queue is sized to ensure that the maximum number of write requests is available to be sent to the memory device over the write latency of the memory device. The write request staging scheme is implemented so that the active write requests stored in the write queue are spread over as many different memory banks of the memory device as possible so that no bank conflicts exist in the write queue. In the event of a long write latency at the memory device, multiple write requests to the same memory bank will reduce the write bandwidth of the memory system as each write request has to wait until the completion of the earlier write request.

Meanwhile, the write staging buffer is used to absorb additional write requests, especially write requests designated to the same memory banks as the active write requests already in the write queue. The write staging buffer implements the write request staging scheme to regulate the flow of write requests being sent to the write queue in a manner to avoid bank conflicts at the write queue so as to maintain the maximum write bandwidth while also ensuring other operating conditions are met. In this manner, the write queue and the write staging buffer operate cooperatively to maximize the write bandwidth of the memory system.

It is instructive to note that the write staging buffer is not operating as a conventional cache memory. Conventional cache memory operates to keep data that are frequently used for as long as possible so as to get as many hits on the cache data as possible. Therefore, conventional cache memory operation tries to not evict stored data as much as possible. The write staging buffer of the present invention is distinguishable from a conventional cache memory in that the write staging buffer operates to evict stored pending write requests as much as possible to the write queue, subject to the conditions of the eviction rules under the write request staging scheme. The write staging buffer does not keep requests in its storage based on frequency of use, but rather evicts entries as long as there is no memory bank conflicts at the write queue. In some examples, the write staging buffer is configured to evict a pending write request stored therein at least every time a new write request arrives at the write staging buffer. Accordingly, the write staging buffer is operative to continuously evict stored pending write requests to maximize the effective bandwidth of the memory device and make room for new write requests that are arriving.

Figure 8:
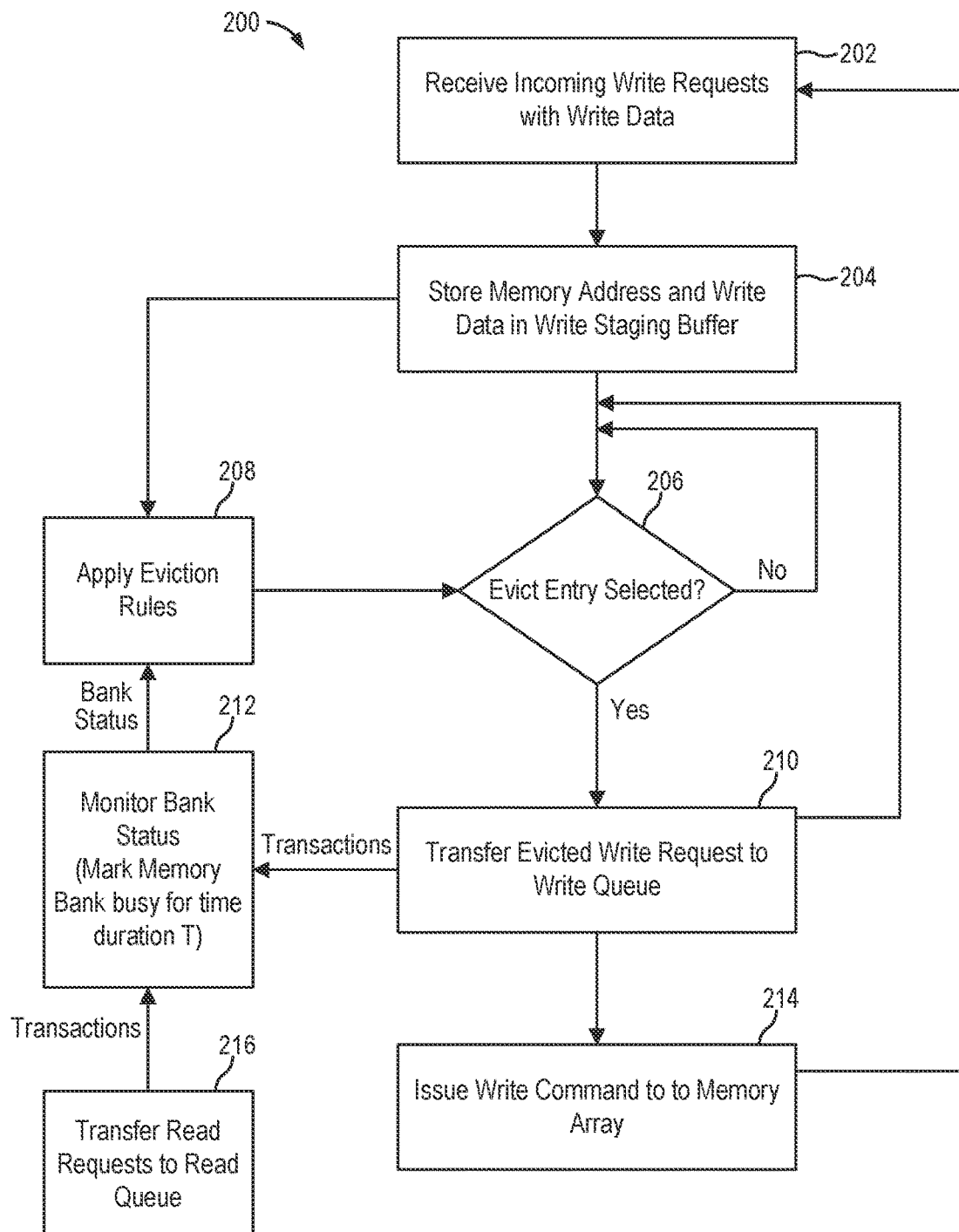
FIG. 8 is a flowchart illustrating a write request staging method that can be implemented in a memory channel controller in embodiments of the present invention.

FIG. 8 is a flowchart illustrating a write request staging method that can be implemented in a memory channel controller in embodiments of the present invention. In some embodiments, the write request staging method of FIG. 8 is implemented in a memory channel controller, such as any of the memory channel controllers described above with reference to FIGS. 1(a), 1(b), 3, 4(a), 4(b), 5 and 6. Referring to FIG. 8, a write request staging method 200 operates to receive incoming write requests with write data (202). The method 200 stores the memory address and write data associated with the write request in a write staging buffer (204). The write requests stored in the write staging buffer is referred to as pending write requests. The method 200 then determines if an entry of the pending write requests has been selected for eviction (206). The method 200 continues to receive incoming write requests and waits for an evict entry to be selected. When a pending write request is selected to be evicted, the method 200 transfers the evicted write request to the write queue (210). Meanwhile, the method 200 may also transfer read requests received by the channel controller to the read queue (216). The method 200 further issues write command to the memory array (214). The method 200 continues to receive incoming write requests (202).

In embodiments of the present disclosure, the write request staging method 200 implements one or more eviction rules to determine when a pending write request should be evicted to the write queue (208). The method 200 monitors the status of memory banks having requests that have been sent to the read queue or write queue. To that end, when a pending write request has been evicted and transferred to the write queue (210), or when an incoming read request is transferred to the read queue (216), the method 200 monitors the transactions to determine the memory bank status associated with the read and write requests that have been transferred (212). In particular, the method 200 marks the memory banks associated with the read and write requests that have been transferred as busy for a time duration T. In some embodiments, the time duration T can be a function of the memory operation (e.g. read or write operation) being performed. For example, the time duration T for a read operation can be 100 ns and the time duration T for a write operation can be 1 μs. The method 200 uses the bank status in applying one or more eviction rules (208) to select pending write requests to be evicted (206).

In embodiments of the present disclosure, the method 200 implements a set of eviction rules to select the pending write requests to be evicted to the write queue. In one embodiment, the method 200 implements a first eviction rule which selects pending write requests to transfer to the write queue when the memory banks associated with the pending write requests are not marked busy. The method 200 monitors the bank status from the transactions being sent to the read queue and the write queue and apply a time based heuristic to mark the memory banks associated with the transactions as busy or idle. More specifically, the method 200 marks a memory bank busy for the time duration T depending on the transaction being sent to that memory bank. After the time duration T, the memory bank is marked not busy or idle. In operation, method 200 continues to send pending write requests to the write queue as long as the memory banks associated therewith is not busy.

In another embodiment, the method 200 implements a second eviction rule which selects a pending write request that has aged pass a maximum time threshold for eviction, even if the memory bank associated therewith is busy. In this manner, the method 200 avoids holding a pending write request in the write staging buffer for exceedingly long time duration.

In another embodiment, the method 200 implements a third eviction rule which selects a pending write request for eviction when the storage area in the write staging buffer designated for the memory bank is almost full, or is near or have exceeded an occupancy threshold. The pending write request in a near-full storage area is evicted even if the memory bank associated therewith is busy. In this manner, the method 200 avoids the write staging buffer becoming full and stalling the ingress write requests.

In other embodiments, the write request staging method implements additional eviction rules to handle cases when an incoming read request or an incoming partial write request matches a pending write request stored in the write staging buffer. The operation of these additional eviction rules will be described in more detail below with reference to FIGS. 9 and 10.

In the embodiment shown in FIG. 8, the write request staging method 200 monitors the memory bank status using the time-based heuristic. In other embodiments, the method 200 can obtain the bank status from a memory bank tracker that tracks commands that are sent out from the read queue and the write queue. In that case, the memory logical address of the pending write requests stored in the write staging buffer should be the same as the memory physical address of the active read/write requests in the read queue and the write queue. Alternately, reverse address translation can be performed from the memory physical address to the memory logical address.

Figure 9:
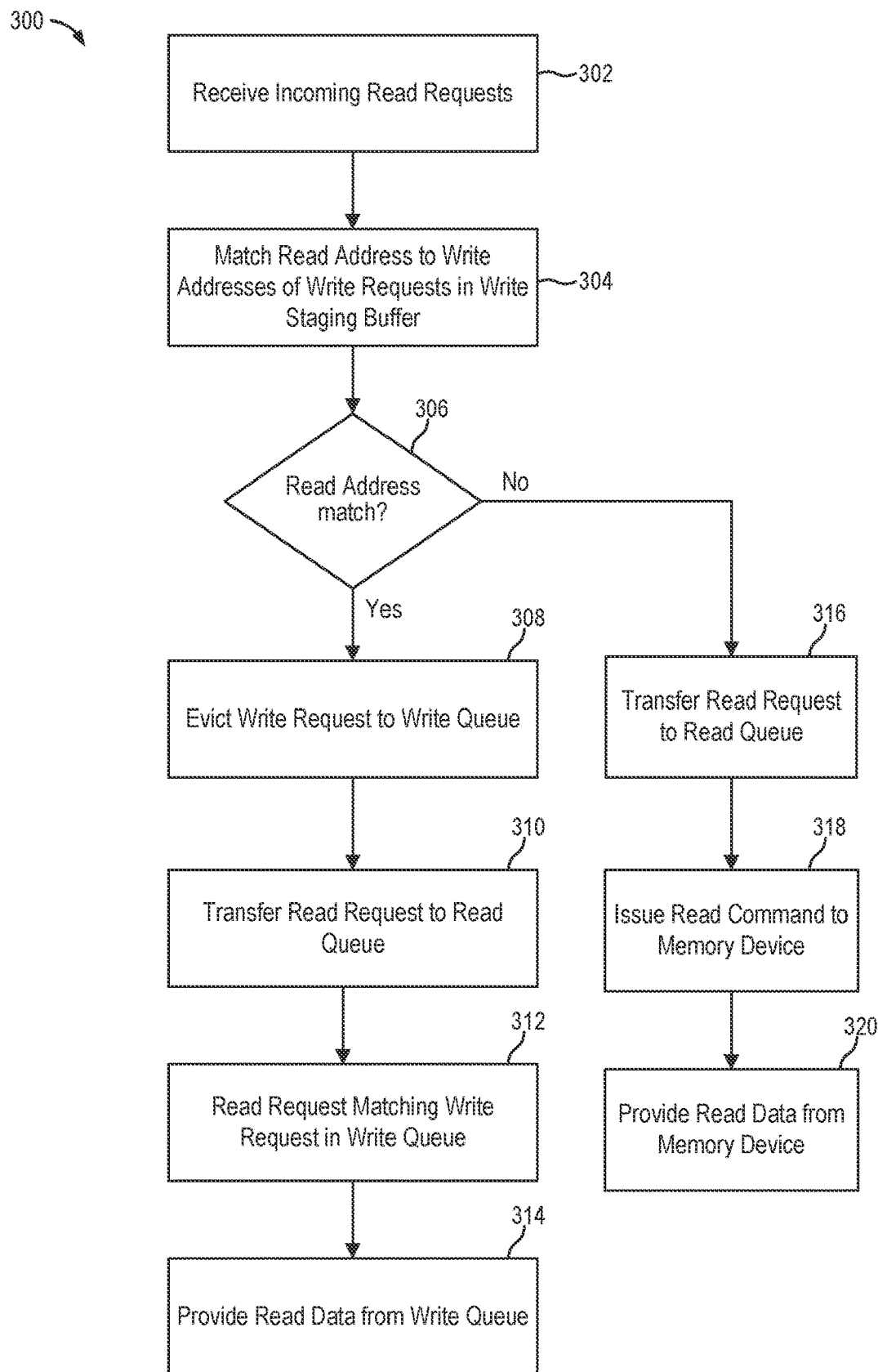
FIG. 9 is a flowchart illustrating the write request staging method handling a read request hitting a pending write request in embodiments of the present invention.

FIG. 9 is a flowchart illustrating the write request staging method handling a read request hitting a pending write request in embodiments of the present invention. In some embodiments, the write request staging method of FIG. 9 is implemented in a memory channel controller, such as any of the memory channel controllers described above with reference to FIGS. 1(a), 1(b), 3, 4(a), 4(b), 5 and 6. Referring to FIG. 9, a write request staging method 300 operates to receive incoming read requests (302). The method 300 matches the memory address of the read request ("read address") to the memory addresses of the pending write requests ("write address") stored in the write staging buffer (304). The method 300 then determines whether the read address matches any of the write addresses (306). In response to the read address not matching any of the write addresses in the write staging buffer, the method 300 continues with the normal read request flow. The read request is transferred to the read queue (316). The read queue issues a read command to the memory device (318). As described above, the read command may be preceded by an activate command to sense the data stored in the memory cells and the read command is issued to read the sensed data. As a result, the read data is provided from the memory device (320).

Alternately, in response to the read address matching a write address in the write staging buffer, the method 300 implements a fourth eviction rule where the method 300 evicts the write request associated with the matched write address to the write queue (308). The method 300 then transfers the read request with the matching read address to the read queue (310). The method 300 matches the read request in the read queue with the write request in the write queue having the same memory address (312). The method 300 then provides the read data from the write request in the write queue (314). In particular, the write data associated with the matching write request is provided as the read data. In this manner, the write request staging method preserves the order of the write and read requests and ensure a read request following a write request to the same memory address will be provided with the correct data.

In some cases, the host device may issue a partial write request. A partial write request is a write request to modify some of the bytes in a memory page of write data. For example, a memory page may include 512 bits or 64 bytes. A write request provides write data to modify the entire 64 bytes of data in the memory page. On the other hand, a partial write request would modify only some of the 64 bytes and will include valid byte indicator bits to identify which of the 64 bytes are to be modified. In embodiments of the present disclosure, the memory channel controller, such as channel controller 110 of FIG. 5, manages partial write requests at the write queue 132. In a normal partial write request flow, the write staging buffer 128 forwards a partial write request directly to the write queue 132. The partial write request includes the destination memory address, the write data and the valid byte indicator bits indicating which byte(s) in the page of memory data at the memory address is to be modified. The write data and the valid byte indicator bits are stored in the write data storage 134. The partial write request causes a read request to be allocated to the read queue and a write request to be allocated to the write queue with the two requests being marked as matched. In response to the allocated read request, the read queue causes a read command to be sent to the memory device to obtain the missing memory data—that is, the memory data that will not be modified by the partial write request. The read out data from the memory device is merged with the write data of the partial write request in the write data storage 134. That is, the read out data is used to fill in the write data in the memory page not provided by the partial write request. In response to the allocated write request, a write command is issued to write the merged or modified write data back to the memory device at the destination memory address.

It is instructive to note that the memory channel controller of the present disclosure implements partial write request handling at the write queue instead of at the write staging buffer which has the advantageous effect of reducing the implementation complexity and also reducing the hardware implementation itself. In particular, a partial write request requires reading of the memory data in order to fill in the remaining data in the memory page. Performing the data merging function of the partial write request at the write queue nearest to where the memory data is being read out, as opposed to merging the data at the write staging buffer, eliminates the complexities of backward memory address translation and having to provide the read data back to the write staging buffer.

In some cases, a partial write request may be received and the write address of the partial write request matches a pending write request in the write staging buffer. In that case, the write request staging method of the present invention implements a fifth eviction rule in order to preserve the order of the write and partial write requests and thereby maintaining the integrity of the write data. In particular, the write request staging method implements the fifth eviction rule to enable a matching partial write request to be processed at the write queue as in the normal partial write request flow.

Figure 10:
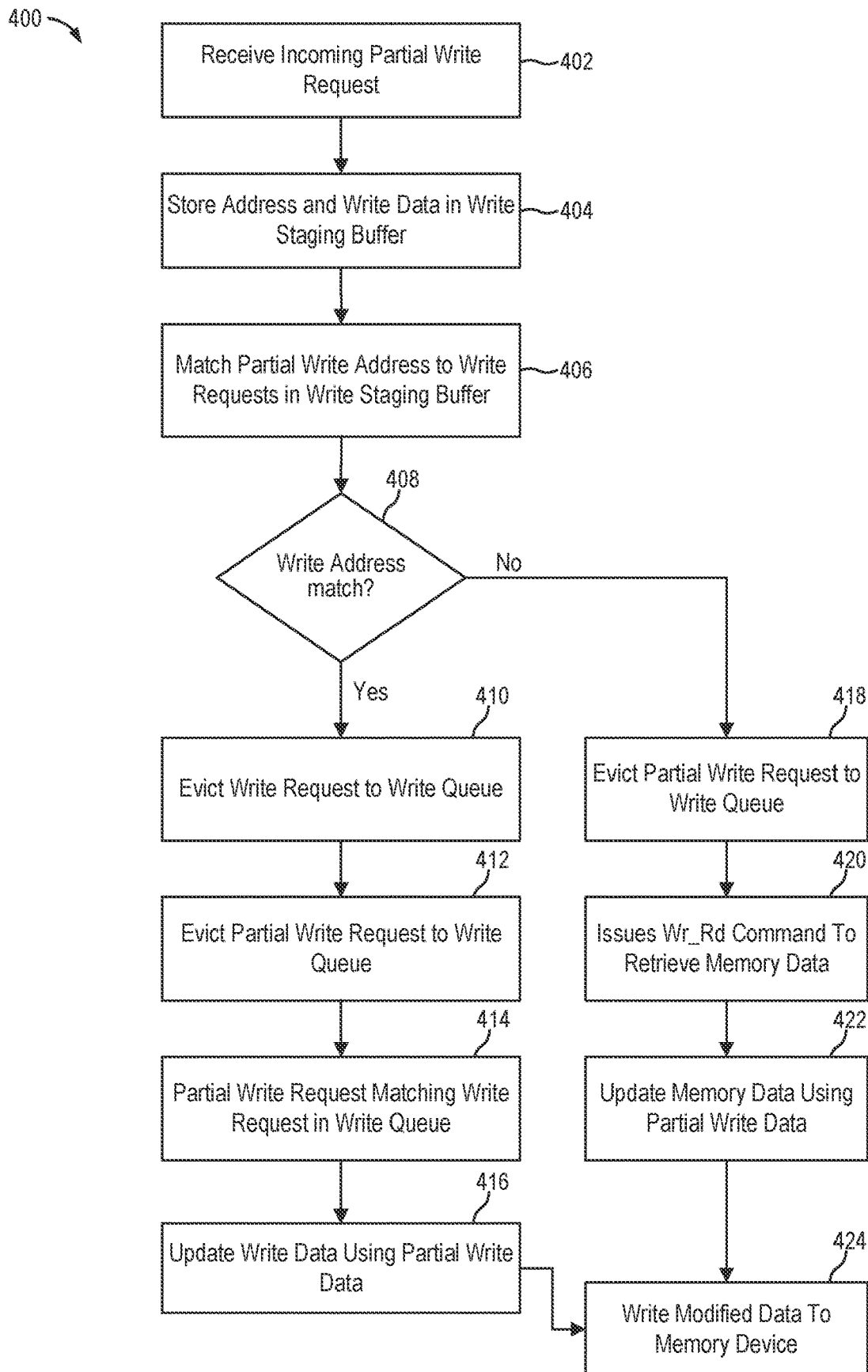
FIG. 10 is a flowchart illustrating the write request staging method handling a partial write request hitting a pending write request in embodiments of the present invention.

FIG. 10 is a flowchart illustrating the write request staging method handling a partial write request hitting a pending write request in embodiments of the present invention. In some embodiments, the write request staging method of FIG. 10 is implemented in a memory channel controller, such as any of the memory channel controllers described above with reference to FIGS. 1(a), 1(b), 3, 4(a), 4(b), 5 and 6. Referring to FIG. 10, a write request staging method 400 operates to receive an incoming partial write request (402). The method 400 stores the memory address of the partial write request, the valid byte indicator bits and the write data in the write staging buffer (404). The method 400 matches the memory address of the partial write request ("partial write address") to the memory addresses of the pending write requests ("write address") in the write staging buffer (406). The method 400 then determines whether the partial write address matches any of the write addresses (408). In response to the partial write address not matching any of the write addresses in the write staging buffer, the method 400 continues with the normal partial write request flow. The partial write request is evicted to the write queue (418). A write_read (Wr_Rd) command is issued to the memory device to retrieve memory data at the memory address of the partial write request (420). In one embodiment, the write_read command is implemented by allocating a read request in the read queue and a matched write request in the write queue. The read request obtains the memory data at the memory address. At the write queue, or the write data storage associated with the write queue, the read out memory data is merged with the write data of the partial write request using the valid byte indicator bits of the partial write requests (422). That is, only the byte(s) indicated by the valid byte indicator bits is (are) updated or modified by the write data. The remaining read out memory data is left unchanged. The modified write data is then written back to the memory device (424).

Alternately, in response to the partial write address matching a write address in the write staging buffer, the method 400 implements a fifth eviction rule where the method 400 evicts the write request associated with the matched write address to the write queue (410). The method 400 then evicts the partial write request to the write queue (412). The method 400 matches the partial write request with the write request in the write queue (414). The method 400 updates or modifies the write data of the write request using the write data of the partial write request and the valid byte indicator bits (416). For example, the write data of the write request is stored in the write data storage associated with the write queue and the matched partial write request modifies the write data using the write data of the partial write request and the valid byte indicator bits. That is, only the byte(s) indicated by the valid byte indicator bits is (are) updated or modified by the write data of the partial write request. The remaining write data of the write request is left unchanged. The modified write data is then written to the memory device (424). In this manner, the write request staging method of the present invention implements the fifth eviction rule to preserve the order of the write and partial write requests, thereby maintaining the integrity of the write data.

Virtual Memory Bank Addresses

Returning to FIG. 5, the memory channel controller 110 of the present invention includes a bank tracker 145 to keep track of the status of the memory banks in the memory channel of the memory device and a command tracker 140 to keep track of the commands issued to the memory banks. The read queue 130 and the write queue 132 use the information in the bank tracker 145 and the command tracker 140 to determine the status of each memory bank to which a read/write request is pending and based on the bank status, determine commands that are eligible for bidding for access at the command selector 135. In some cases, the memory device includes a large number of memory banks. In one example, each memory channel of the memory device may include one to two thousand memory banks. Accordingly, the command tracker 140 and bank tracker 145 would have to keep track of the status of a large number of memory banks. In some cases, at any given time, the memory device may perform memory operations on only a subset of the total number of memory banks. For example, the memory device may perform memory operations on only 400 of the 1024 memory banks at any given time. In that case, the requirement for the bank tracker and the command tracker to keep track of all 1024 memory banks may be burdensome.

In embodiments of the present invention, the memory channel controller implements a virtual memory bank addressing scheme where virtual bank addresses, also referred herein as virtual bank indexes, are used to encode active memory banks in the read queue and write queue and associated tracker circuits. The virtual memory bank addressing scheme enables the read queue and write queue as well as the bank tracker and the command tracker to track only active memory banks, which is a subset of the physical memory banks. In this manner, resources the memory channel controller needed to maintain bank status information can be minimized, thereby reducing implementation cost and complexity.

In the present description, "active memory banks" refer to memory banks with active read requests in the read queue or active write requests in the write queue. In the present embodiment, an active read/write request in the respective read/write queue issues a command to bid for access to the memory device and in the case the command is selected and sent to the memory device, the issued request remains in the respective read/write queue until the command tracker indicates the command has been completed at the memory device. In that case, the active read requests and the active write requests in the read and write queue, respectively, are associated with memory banks that are currently active, which include memory banks with active read/write requests in the read/write queue waiting to be executed and memory banks that are executing memory operations in response to issued read or write requests. In other words, the active memory banks include memory banks with active read requests and active write requests pending in the respective read and write queues and issued read and write requests sent to the memory device and pending completion.

As described above, in some embodiments, the write queue may be coupled to an issued write queue where active write requests issued to the memory device are stored until completion of the write operation. In that case, active memory banks refer to memory banks with active read requests in the read queue, active write requests in the write queue, and issued write requests in the issued write queue.

In embodiments of the present disclosure, virtual memory bank addresses or virtual bank indexes are used by the channel controller to identify these active memory banks, instead of using the physical memory bank address. In the present description, a virtual memory bank address or virtual bank index is virtual because it does not identify the physical memory bank address in the memory device but rather is an identifier or a placeholder to identify the memory address of an active memory bank without using the physical memory bank address. In the memory channel controller, virtual bank indexes are used at the read/write queues, the command selector, the command tracker and the bank tracker to identify the active memory banks. When the active memory banks are a small number of the total memory banks in the memory channel, using virtual bank indexes reduces hardware implementation cost in the channel controller. Furthermore, when the command tracker and bank tracker operate on virtual memory bank addresses rather than memory bank addresses, increasing or changing memory size or the number of memory banks in the memory channel does not change the hardware implementation of the channel controller. The channel controller can be readily adapted to operate memory devices with any number of memory banks in a memory channel.

Figure 11:
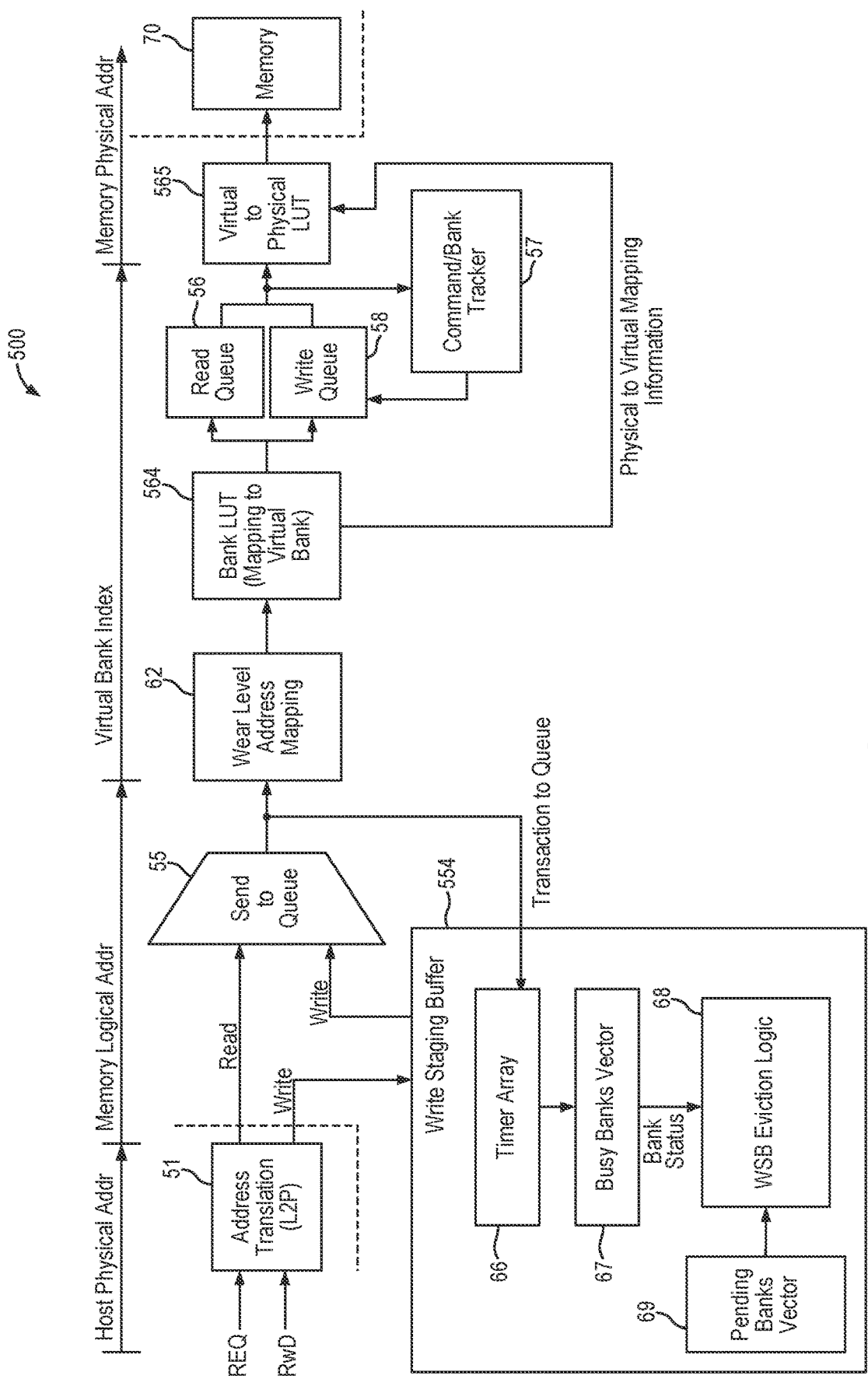
FIG. 11 is a representative block diagram of a memory channel controller illustrating implementation of virtual bank addresses in embodiments of the present invention.

FIG. 11 is a representative block diagram of a memory channel controller illustrating implementation of virtual bank indexes in embodiments of the present invention. Referring to FIG. 11, a memory controller incorporating a channel controller 500 receives incoming read and write requests from a host processor. The incoming read requests (REQ) and write requests (RwD) are encoded with the host physical address and are first provided to an address translation circuit 51 to convert the host physical address to a memory logical address. The decoded read requests and write requests are then provided to the channel controller 500.

The channel controller 500 receives the incoming read requests and the incoming write requests with the memory address decoded to the memory logical address. The channel controller 500 stores the pending read requests in an ingress buffer (not shown) which provides the pending read requests to the read queue 56. In the present embodiment, the channel controller 500 stores the write requests in the write staging buffer 554 as pending write requests and the write staging buffer 554 provides the pending write requests to the write queue 58 based on the write request staging scheme described herein. In some embodiments, the channel controller 500 includes an arbitration circuit 55 to select a pending read request or an evicted pending write request to pass to the respective read queue 56 and write queue 58. In the present embodiment, after a pending request (read or write) is selected, the channel controller 500 performs additional address mapping to convert the memory logical address to the memory physical address. In the present embodiment, the channel controller 500 performs wear leveling address mapping 62. For instance, wear leveling is applied to map the memory logical addresses to different memory physical addresses so that the same memory physical addresses are not being used all of the time. In the present embodiment, the channel controller 500 further performs bank address mapping through the use of a bank lookup table (LUT) 564. Bank address mapping is performed to replace one memory bank with a spare memory bank, such as to replace a defective memory bank or to retire a memory bank with a high level of wear out. After the wear-level address mapping and bank address mapping, the read requests or write requests have their memory logical addresses converted to corresponding memory physical addresses.

In embodiments of the present disclosure, the bank LUT 564 further performs a virtual memory bank address mapping. The virtual bank address mapping maps the memory bank address of the memory physical address to a virtual bank index. The virtual bank index includes enough address bits to identify the maximum number of active memory banks with the active requests in the read queue and the write queue, including the issued requests. That is, the virtual bank indexes are used to identify active memory banks with active read requests in the read queue, active write requests in the write queue and issued read and write requests pending completion. As thus configured, the virtual bank index only tracks a subset of the total number of memory banks in the memory channel, reducing the resource needed in the channel controller. For example, the channel controller may be operating on a memory channel with 1024 banks of the memory device and the virtual bank index may include only 400 bank indexes to track up to 400 possible active memory banks. Instead of keeping tracking of 1024 bank addresses, the channel controller can use virtual bank indexes to keep track of only 400 bank indexes.

In implementation, after the address mapping by the wear level address mapping 62, the bank LUT 564 performs bank address mapping, such as for redundancy purpose, to obtain the memory physical address. The LUT 564 further encodes the memory bank address in the memory physical address with a virtual bank index. The encoded read or write requests are stored in the read queue 56 or the write queue 58 as active requests. The read queue 56 and the write queue 58 arbitrate to send commands to the memory device 70. In particular, the read and write queues bid for access to the memory device through a command selector (omitted in FIG. 11), such as the command selector 135 in FIG. 5. The read and write queues issue commands to the command selector corresponding to the active read/write requests in the queues. The command selector selects a command and the selected command is processed through a second address mapping look-up table (LUT) 565 to convert the selected command encoded with the virtual bank index to a command encoded with the memory physical address. The command, encoded with the memory physical address, is then sent to the memory device 70. It is instructive to note that the address mapping look-up table 565 is in communication with the bank LUT 564 to obtain the memory bank address to virtual bank index mapping information. In particular, the memory bank address to virtual bank index mapping information identifying the mapping of the memory bank addresses to virtual bank indexes. The address mapping look-up table 565 uses the memory bank address to virtual bank index mapping information to convert the memory address of the selected command encoded with the virtual bank index back to the memory physical address encoded with the corresponding memory bank address.

The channel controller 500 includes a command and bank tracker 57 which monitors the commands being sent to the memory device 70 and the memory banks at which commands have been sent. The read queue 56 and the write queue 58 uses the bank status information from the command and bank tracker 57 to determine which active request to send to the memory device 70. For instance, the read queue and the write queue do not attempt to send a request to the memory device if the memory bank associated therewith is already processing a previously sent request. In embodiments of the present invention, the read queue 56, the write queue 58, the command and bank tracker 57 are all operating using the virtual bank index and the read/write requests are converted to the memory physical address only when the commands are selected by the command selector to issue to the memory device. With the use of the virtual bank index, the memory controller only keep tracks of the active memory banks, that is, memory banks with active read requests and active write requests, instead of keeping track of the status of all of the memory banks of the memory channel. In one example, the virtual memory bank addresses include 416 virtual bank indexes for a memory channel of 1024 total memory banks. By using the virtual bank index, the command and bank tracker 57 needs to keep track of the bank status for only 416 possible active memory banks, instead of all 1024 memory banks of the memory channel.

As thus configured, the write staging buffer 554 cannot make use of the bank status information from the command and bank tracker 57 because the bank addresses are in different address space. In particular, the write staging buffer 554 stores pending read/write requests using the memory logical address space while the read/write queue 56, 58 stores active read/write requests using the virtual bank indexes. In the present embodiment, the write staging buffer 554 implements a bank status tracking scheme that operates only on the memory logical address space, therefore, not requiring any reverse address mapping from the virtual bank address. More specifically, the write staging buffer 554 implements a bank status tracking scheme using a time based heuristic as described above with reference to FIG. 4(b) which monitors the transactions that are being sent to the read queue and the write queue before any additional address mapping. The use of the virtual bank address mapping does not affect the operation of the write staging buffer.

In some embodiments, a method in a memory control circuit interacting with a memory device to perform read and write operations at the memory device, the memory device including storage transistors organized in multiple memory banks, each memory bank including multiple memory pages, the method including: receiving, at a write ingress buffer, write requests with write data designated for memory pages in multiple memory banks; storing the write requests in a write staging buffer as pending write requests; evaluating, at the write staging buffer, status of the memory banks for the pending write requests stored in the write staging buffer; and in response to a first memory bank associated with a first pending write request being identified as idle or not busy, transferring the first pending write request from the write staging buffer to a write queue, the first pending write request being stored at the write queue as an active write request.

In further embodiments, the method includes transferring the pending write requests in the write staging buffer to the write queue to maximize the number of active write requests that are addressed to different memory banks of the memory device. In other embodiments, the method includes transferring a second pending write request to the write queue in response to the second pending write request having remained in the write staging buffer for longer than a maximum time threshold, the second pending write request being transferred to the write queue regardless of whether the memory bank associated with the second pending write request has a bank status identified as idle or busy.

In further embodiments, the method includes transferring a third pending write request to the write queue in response to a storage area in the write staging buffer having a storage capacity at or exceeding an occupancy threshold, the third pending write request being transferred to the write queue regardless of whether the memory bank associated with the third pending write request has a bank status identified as idle or busy.

In further embodiments, the method includes receiving, at a read ingress buffer, read requests designated for memory pages in the memory banks; transferring the read requests from the read ingress buffer to a read queue as active read requests; reading memory data from the memory device in response to the active read requests in the read queue; and writing memory data to the memory device in response to the active write requests in the write queue.

In further embodiments, the method includes marking, at the write staging buffer, a memory bank as idle or not busy in response to the memory bank associated with a pending write request being not one of the memory banks associated with the active write requests in the write queue or one of the memory banks associated with the active read requests in the read queue.

In further embodiments, the method includes in response to an incoming read request being transferred to the read queue from the read ingress buffer or a pending write request being transferred to the write queue from the write staging buffer, marking, at the write staging buffer, the memory bank associated with the transferred request as busy for a first duration, the memory bank being marked as idle or not busy at the expiration of the first duration.

In further embodiments, the method includes assigning a first value to the first duration in response to the transferred request being a read request and assigning a second value to the first duration in response to the transferred request being a write request, the second value being different from the first value.

In further embodiments, the method includes keeping one or more pending write requests in the write staging buffer in response to the memory banks associated with the one or more pending write requests being marked as busy.

In further embodiments, the method includes providing, from the read ingress buffer, the memory address of each incoming read request to the write staging buffer; comparing the memory address of the incoming read request with the memory address of the pending write requests in the write staging buffer; in response to the memory address of a first read request matching the memory address of a pending write request, transferring from the write staging buffer the pending write request to the write queue; transferring from the read ingress buffer the first read request to the read queue; and obtaining the read data for the first read request from the matching write request in the write queue.

In further embodiments, each incoming write request comprises write data for a page of memory data in a memory bank, the page comprising multiple bytes of data; and the write ingress buffer receives a partial write request including a valid byte indicator, the partial write request comprising write data for a subset of bytes in a page of memory data and the valid byte indicator identifies one or more bytes of data in the page to be modified. The method further includes receiving a partial write request with write data and valid byte indicator; storing the partial write request in the write staging buffer; comparing the memory address of the partial write request with the memory addresses of the pending write requests; in response to the memory address of the partial write request matching the memory address of a pending write request, transferring from the write staging buffer the pending write request to the write queue; transferring from the write staging buffer the partial write request to the write queue; and modifying, at the write queue, the write data for the transferred write request using the write data of the partial write request and the valid byte indicator. In further embodiments, the memory device comprises a two-dimensional array of memory banks, each memory banks comprising a three-dimensional array of NOR memory strings.

In this detailed description, process steps described for one embodiment may be used in a different embodiment, even if the process steps are not expressly described in the different embodiment. When reference is made herein to a method including two or more defined steps, the defined steps can be carried out in any order or simultaneously, except where the context dictates or specific instruction otherwise are provided herein. Further, unless the context dictates or express instructions otherwise are provided, the method can also include one or more other steps carried out before any of the defined steps, between two of the defined steps, or after all the defined steps.

In this detailed description, various embodiments or examples of the present invention may be implemented in numerous ways, including as a process; an apparatus; a system; and a composition of matter. A detailed description of one or more embodiments of the invention is provided above along with accompanying figures that illustrate the principles of the invention. The invention is described in connection with such embodiments, but the invention is not limited to any embodiment. Numerous modifications and variations within the scope of the present invention are possible. The scope of the invention is limited only by the claims and the invention encompasses numerous alternatives, modifications, and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. The present invention is defined by the appended claims.

The invention claimed is:

1. A memory system, comprising:
a memory device comprising an array of storage transistors for storing data, the storage transistors being organized in a plurality of memory banks, each memory bank including a plurality of memory pages; and
a control circuit configured to interact with the memory device to perform read and write operations, the control circuit comprising a read queue configured to store active read requests for reading data from the memory device, a write queue configured to store active write requests for writing data to the memory device, and a write staging buffer configured to store pending write requests received by the control circuit and to transfer the pending write requests to the write queue to maximize a number of the active write requests that are addressed to different memory banks of the memory device.

2. The memory system of claim 1, wherein the write staging buffer is configured to transfer a first pending write request to the write queue in response to a memory bank associated with the first pending write request being (i) not one of the memory banks associated with the active write requests in the write queue or (ii) not one of the memory banks associated with the active read requests in the read queue.

3. The memory system of claim 1, wherein the write staging buffer is configured to transfer a second pending write request to the write queue in response to a memory bank, associated with the second pending write request, having a bank status identified as idle or not busy.

4. The memory system of claim 3, wherein the write staging buffer is configured to transfer a third pending write request to the write queue in response to the third pending write request having remained in the write staging buffer for longer than a maximum time threshold, the third pending write request being transferred to the write queue regardless of whether a memory bank, associated with the third pending write request, has a bank status identified as idle or busy.

5. The memory system of claim 3, wherein the write staging buffer is configured to transfer a fourth pending write request to the write queue in response to a storage area in the write staging buffer having a storage capacity at or exceeding an occupancy threshold, the fourth pending write request being transferred to the write queue regardless of whether a memory bank, associated with the fourth pending write request, has a bank status identified as idle or busy.

6. The memory system of claim 1, wherein the control circuit further comprises:

a read ingress buffer configured to receive incoming read requests received by the control circuit and to transfer the incoming read requests to the read queue; and
a write ingress buffer configured to receive incoming write requests received by the control circuit and to transfer the incoming write requests to the write staging buffer to store as the pending write requests.

7. The memory system of claim 6, wherein in response to (i) an incoming read request being transferred to the read queue from the read ingress buffer or (ii) a pending write request being transferred to the write queue from the write staging buffer, the write staging buffer marks a memory bank, associated with the incoming read request or the pending write request, as busy for a first duration, the memory bank being marked as idle or not busy at an expiration of the first duration.

8. The memory system of claim 7, wherein the write staging buffer is configured to transfer one or more pending write requests to the write queue in response to the memory banks associated with the one or more pending write requests being marked as idle or not busy.

9. The memory system of claim 7, wherein the write staging buffer is configured to keep one or more pending write requests in the write staging buffer in response to the memory banks associated with the one or more pending write requests being marked as busy.

10. The memory system of claim 7, wherein (i) the first duration has a first value in response to the incoming read request being transferred to the read queue and (ii) the first duration has a second value in response to the pending write request being transferred to the write queue, the second value being different from the first value.

11. The memory system of claim 3, wherein the control circuit further comprises a bank tracker configured to track status of the memory banks having read requests or write requests being sent to the memory device, the bank tracker identifying a memory bank as busy in response to a read or write request being sent to the memory device and identifying a memory bank as idle or not busy in response to (i) no request being sent or (ii) previously sent request being completed, wherein the write staging buffer obtains the status of the memory banks from the bank tracker.

12. The memory system of claim 6, wherein the read ingress buffer provides a memory address of a first incoming read request to the write staging buffer, the write staging buffer compares the memory address of the first incoming read request with memory addresses of the pending write requests stored in the write staging buffer; and in response to the memory address of the first incoming read request matching one of the memory addresses, wherein the one of the memory addresses correspond to a memory address of a first pending write request of the pending write requests, the write staging buffer transfers the first pending write request to the write queue and the read ingress buffer transfers the first incoming read request to the read queue, the read queue obtaining read data, for the first incoming read request, from the first pending write request in the write queue.

13. The memory system of claim 6, wherein:
each incoming write request comprises write data for a page of memory data in a memory bank, the page comprising a plurality of bytes of data; and
the write ingress buffer receives a partial write request including a valid byte indicator, the partial write request comprising write data for a subset of bytes in a first page of memory data and the valid byte indicator identifies one or more bytes of memory data in the first page to be modified; and in response to the write ingress buffer receiving the partial write request, the partial write request is stored in the write staging buffer, the write staging buffer compares a memory address of the partial write request with memory addresses of the pending write requests; and in response to the memory address of the partial write request matching one of the memory addresses, wherein the one of the memory addresses correspond to a memory address of a first pending write request of the pending write requests, the write staging buffer transfers the first pending write request to the write queue and then transfers the partial write request to the write queue, the write queue modifies write data for the first pending write request using the write data of the partial write request and the valid byte indicator.

14. The memory system of claim 1, wherein the memory device comprises a two-dimensional array of memory banks, each memory banks comprising a three-dimensional array of NOR memory strings.

15. The memory system of claim 1, wherein the control circuit comprises control circuitry formed in a general purpose integrated circuit.

16. The memory system of claim 1, wherein the control circuit comprises a controller device formed in a discrete semiconductor die.

17. A method in a memory control circuit interacting with a memory device to perform read and write operations at the memory device, the memory device including storage transistors organized in a plurality of memory banks, each memory bank including a plurality of memory pages, the method comprising:
  receiving, at a write ingress buffer, write requests with write data designated for memory pages in the plurality of memory banks;
  storing the write requests in a write staging buffer as pending write requests;
  evaluating, at the write staging buffer, status of the memory banks for the pending write requests stored in the write staging buffer; and
  in response to a first memory bank associated with a first pending write request being identified as idle or not busy, transferring the first pending write request from the write staging buffer to a write queue, the first pending write request being stored at the write queue as an active write request.

18. The method of claim 17, further comprising:
transferring the pending write requests in the write staging buffer to the write queue to maximize a number of active write requests that are addressed to different memory banks of the memory device.

19. The method of claim 17, further comprising:
transferring a second pending write request to the write queue in response to the second pending write request having remained in the write staging buffer for longer than a maximum time threshold, the second pending write request being transferred to the write queue regardless of whether a memory bank, associated with the second pending write request, has a bank status identified as idle or busy.

20. The method of claim 17, further comprising:
transferring a third pending write request to the write queue in response to a storage area in the write staging buffer having a storage capacity at or exceeding an occupancy threshold, the third pending write request being transferred to the write queue regardless of whether a memory bank, associated with the third pending write request, has a bank status identified as idle or busy.

21. The method of claim 17, further comprising:
receiving, at a read ingress buffer, read requests designated for memory pages in the plurality of memory banks;
transferring the read requests from the read ingress buffer to a read queue as active read requests;
reading memory data from the memory device in response to the active read requests in the read queue; and
writing memory data to the memory device in response to active write requests in the write queue.

22. The method of claim 21, further comprising:
marking, at the write staging buffer, a memory bank as idle or not busy in response to the memory bank, associated with a pending write request, being (i) not one of the memory banks associated with the active write requests in the write queue or (ii) not one of the memory banks associated with the active read requests in the read queue.

23. The method of claim 21, further comprising:
in response to (i) an incoming read request being transferred to the read queue from the read ingress buffer or (ii) a pending write request being transferred to the write queue from the write staging buffer, marking, at the write staging buffer, a memory bank, associated with the incoming read request or the pending write request, as busy for a first duration, the memory bank being marked as idle or not busy at an expiration of a first duration.

24. The method of claim 23, further comprising:
assigning a first value to the first duration in response to the incoming read request being transferred to the read queue and assigning a second value to the first duration in response to the pending write request being transferred to the write queue, the second value being different from the first value.

25. The method of claim 23, further comprising:
keeping one or more pending write requests in the write staging buffer in response to the memory banks associated with the one or more pending write requests being marked as busy.

26. The method of claim 21, further comprising:
providing, from the read ingress buffer, a memory address of a first read request to the write staging buffer;
comparing the memory address of the first read request with memory addresses of the pending write requests in the write staging buffer;
in response to the memory address of the first read request matching one of the memory addresses, wherein the one of the memory addresses correspond to a memory address of a second pending write request, transferring from the write staging buffer the second pending write request to the write queue;
transferring from the read ingress buffer the first read request to the read queue; and
obtaining read data, for the first read request, from the second pending write request in the write queue.

27. The method of claim 21, wherein each incoming write request comprises write data for a page of memory data in a memory bank, the page comprising a plurality of bytes of data; and
  the write ingress buffer receives a partial write request including a valid byte indicator, the partial write request comprising write data for a subset of bytes in a first page of memory data and the valid byte indicator identifies one or more bytes of memory data in the first page to be modified, the method further comprising:

receiving the partial write request with write data and valid byte indicator;

storing the partial write request in the write staging buffer;

comparing a memory address of the partial write request with memory addresses of the pending write requests;

in response to the memory address of the partial write request matching one of the memory addresses, wherein the one of the memory addresses correspond to a memory address of a second pending write request of the pending write requests, transferring from the write staging buffer the second pending write request to the write queue;

transferring from the write staging buffer the partial write request to the write queue; and modifying, at the write queue, write data for the second pending write request using the write data of the partial write request and the valid byte indicator.

28. The method of claim 17, wherein the memory device comprises a two-dimensional array of memory banks, each memory banks comprising a three-dimensional array of NOR memory strings.

\* \* \* \* \*